US011614849B2

(12) United States Patent
Field et al.

(10) Patent No.: US 11,614,849 B2
(45) Date of Patent: Mar. 28, 2023

(54) COLLABORATIVE VIRTUAL REALITY ENVIRONMENT FOR TRAINING

(71) Applicant: Thermo Fisher Scientific, Inc., Waltham, MA (US)

(72) Inventors: Mark Field, Rancho Santa Fe, CA (US); Daniel Garden, San Marcos, CA (US)

(73) Assignee: Thermo Fisher Scientific, Inc., Waltham, MA (US)

( * ) Notice: Subject to any disclaimer, the term of this patent is extended or adjusted under 35 U.S.C. 154(b) by 0 days.

(21) Appl. No.: 17/251,848

(22) PCT Filed: May 13, 2019

(86) PCT No.: PCT/US2019/032056
§ 371 (c)(1),
(2) Date: Dec. 14, 2020

(87) PCT Pub. No.: WO2019/222113
PCT Pub. Date: Nov. 21, 2019

(65) Prior Publication Data
US 2021/0255756 A1 Aug. 19, 2021

Related U.S. Application Data

(60) Provisional application No. 62/671,893, filed on May 15, 2018.

(51) Int. Cl.
*G06F 3/04815* (2022.01)
*G06F 21/46* (2013.01)
(Continued)

(52) U.S. Cl.
CPC .......... *G06F 3/04815* (2013.01); *G06F 3/011* (2013.01); *G06F 3/013* (2013.01);
(Continued)

(58) Field of Classification Search
None
See application file for complete search history.

(56) References Cited

U.S. PATENT DOCUMENTS 5,802,296 A * 9/1998 Morse ........................ G06F 3/14
345/7
8,992,232 B2 * 3/2015 Berry ..................... G09B 23/28
434/267

(Continued)

OTHER PUBLICATIONS

Webel et al., An augmented reality training platform for assembly and maintenance skills, 2013 (Year: 2013).*
(Continued)

*Primary Examiner* — Jordany Nunez

(57) ABSTRACT

A system including a display output device, a computer including instructions that when executed by the computer, cause the computer to generate a virtual environment, instantiate one or more virtual devices into the virtual environment, instantiate a user representation into the virtual environment, and display the virtual environment, the one or more virtual devices, and the user representation on the display output device, an input device to receive a movement input associated with movement by the user representation in the virtual environment, and the computer further configured with instructions to move or rotate the one or more virtual devices relative to a point of reference in the virtual environment in response to the movement input, while maintaining the user representation stationary.

20 Claims, 28 Drawing Sheets

(51) Int. Cl.
    *G06F 3/0482* (2013.01)
    *G06F 3/01* (2006.01)
    *G06T 19/00* (2011.01)
    *G06F 3/04845* (2022.01)

(52) U.S. Cl.
    CPC ............ *G06F 3/017* (2013.01); *G06F 3/0482* (2013.01); *G06F 3/04845* (2013.01); *G06T 19/006* (2013.01)

(56) References Cited

U.S. PATENT DOCUMENTS

| | | | |
|---|---|---|---|
| 9,898,864 B2 | 2/2018 | Shapira et al. | |
| 10,255,727 B1* | 4/2019 | Gribetz | G06T 19/20 |
| 10,481,755 B1* | 11/2019 | Ngo | G06F 3/0304 |
| 10,768,665 B2* | 9/2020 | Aimone | A61B 5/0024 |
| 10,796,486 B2* | 10/2020 | Myers | G02B 27/01 |
| 11,215,817 B1* | 1/2022 | Aksoy | G02B 27/0172 |
| 2007/0160961 A1* | 7/2007 | Lum | A63F 13/5252 434/29 |
| 2007/0242065 A1* | 10/2007 | O'Flynn | G09B 9/003 345/419 |
| 2009/0029325 A1* | 1/2009 | Hetherington | G09B 9/05 434/29 |
| 2009/0249226 A1 | 10/2009 | Manolescu et al. | |
| 2009/0305198 A1* | 12/2009 | Lefevre | F41A 33/00 434/20 |
| 2010/0257463 A1* | 10/2010 | Ducheneaut | A61B 34/20 715/757 |
| 2012/0249416 A1 | 10/2012 | Maciocci | |
| 2013/0335405 A1 | 12/2013 | Scavezze | |
| 2015/0019983 A1* | 1/2015 | White | G06F 16/26 715/739 |
| 2015/0032414 A1* | 1/2015 | Rozsa | G01B 9/04 702/167 |
| 2016/0026242 A1* | 1/2016 | Burns | G02B 27/017 345/633 |
| 2016/0027216 A1* | 1/2016 | da Veiga | G06F 3/011 345/419 |
| 2016/0147408 A1* | 5/2016 | Bevis | G01B 11/24 715/850 |
| 2017/0123520 A1* | 5/2017 | Kim | G06F 3/0362 |
| 2017/0169561 A1* | 6/2017 | Mullins | G02B 27/0172 |
| 2017/0237789 A1* | 8/2017 | Harner | H04L 65/4015 709/205 |
| 2018/0012074 A1* | 1/2018 | Holz | G06F 3/00 |
| 2019/0012728 A1* | 1/2019 | Horn | G06Q 10/087 |
| 2019/0012837 A1* | 1/2019 | Myers | G06F 3/03543 |
| 2019/0347547 A1* | 11/2019 | Ebstyne | G06T 17/00 |
| 2020/0098156 A1* | 3/2020 | Grant | G06F 3/013 |
| 2020/0168311 A1* | 5/2020 | Nguyen | G06F 3/011 |
| 2020/0356136 A1* | 11/2020 | Aimone | A61B 5/6831 |

OTHER PUBLICATIONS

Scwald, "An augmented reality system fortraining and assistance to maintenance in the industrial context", 2003 (Year: 2003).*
Communication dated Jan. 17, 2022 in EP Application No. 19729594.
International Search Report for Application No. PCT/US2019/032056, dated Aug. 6, 2019.

* cited by examiner

COLLABORATIVE VIRTUAL REALITY ENVIRONMENT FOR TRAINING

CROSS-REFERENCE TO RELATED APPLICATIONS

This application is a U.S. 371 of International Application No. PCT/US2019/032056 filed May 13, 2019, which claims priority to U.S. Application No. 62/671,893 filed May 15, 2018, which disclosures are herein incorporated by reference in their entirety.

BACKGROUND

Virtual reality devices enable a user to interact with a virtual environment that simulates a real environment and devices. Such virtual environments may be utilized to provide training on devices that may be too expensive to provide a training device or that risk destruction of the device during training. However, the effectiveness of the training may be limited by the virtual environment itself, and the movement of a user's perceived position within that virtual environment. Conventional virtual reality systems may utilize "teleportation" to move within the environment, which may result in motion sickness for the user. This then limits the effectiveness a session as learning may be reduced due to increased visual stimuli. Furthermore, the duration of the training session may be prematurely shortened due to the resulting motion sickness.

BRIEF SUMMARY

A system provides movement within a virtual environment based on a user representation and a point of reference. As movement inputs are received, the field of view of the user representation is altered such that the user representation remains stationary within the virtual environment, while the virtual environment and any instanced devices, tools, objects, and other users may be moved relative to the point of reference. The rate at which the field of view is altered may be adjustable to further reduce any motion sickness. The system further provides for multiple user representations to interact with the same virtual environment, each having its own point of reference to move the virtual environment while the corresponding user representation remains stationary.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
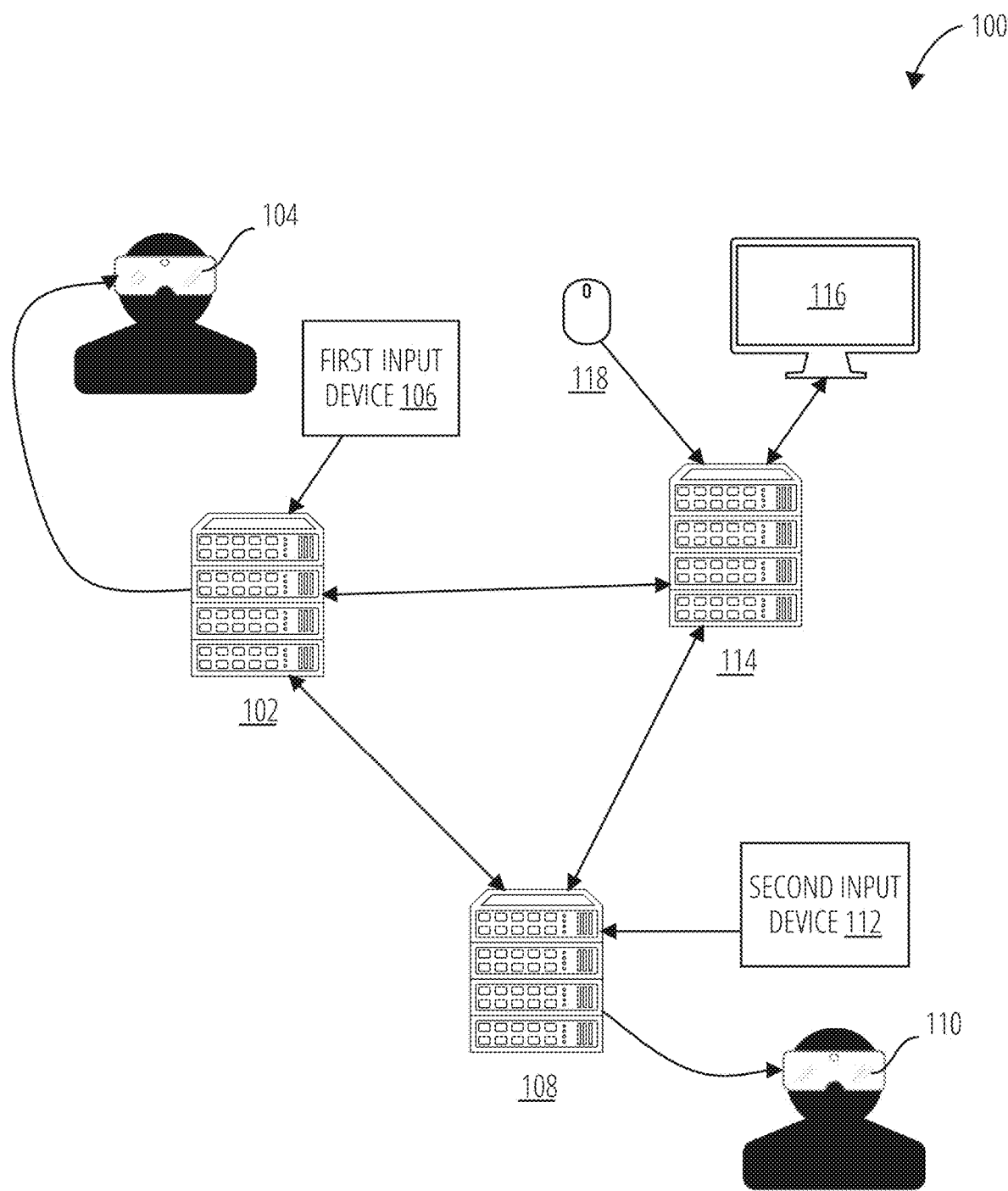
FIG. 1 illustrates an embodiment of a computing environment 100.
Figure 7:
FIG. 7 illustrates an embodiment of a display output 700.
Figure 8:
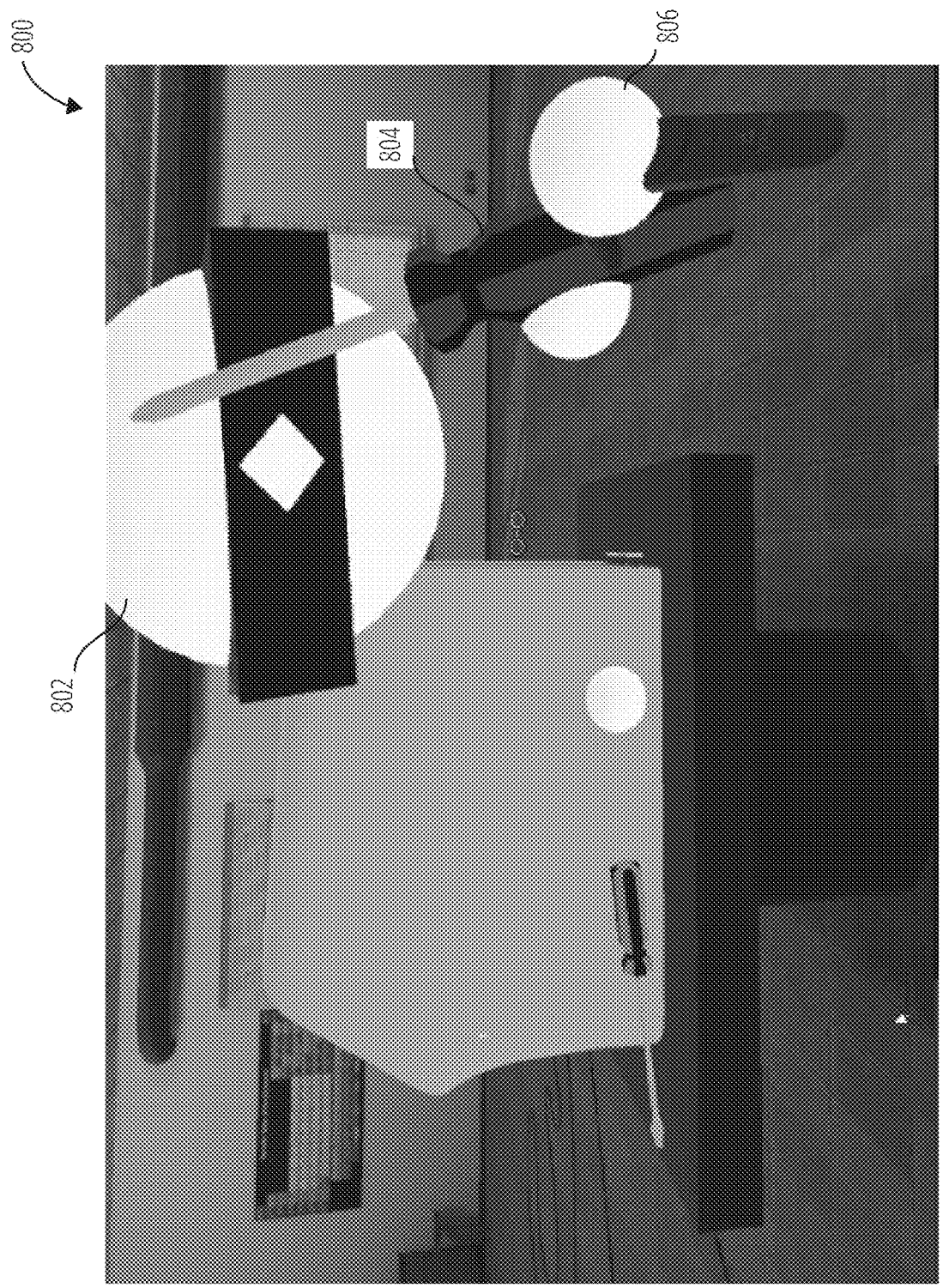
FIG. 8 illustrates an embodiment of a display output 800.
Figure 9:
FIG. 9 illustrates an embodiment of a display output 900.

Referring to FIG. 1, FIG. 1 shows a collaborative environment involving multiple users. The collaborative a computing environment 100 comprises a first computer 102, a first virtual reality device 104, a first input device 106, a second computer 108, a second virtual reality device 110, a second input device 112, a third computer 114, a machine display 116, and a third input device 118. In some embodiments, the collaborative environment may include two operational units such as computer to computer, a virtual reality device to computer or virtual reality device to virtual reality device. Additionally, in some embodiments, one user may operate in a collaborative environment by themselves to train in the collaborative environment without the assistance of another user. For example, FIGS. 7, 8, and 9 show one user representation within the virtual environment.

The first computer 102, the second computer 108, and the third computer 114 receive inputs from the first input device 106, the second input device 112, and the third input device 118, respectively. A user may be equipped with a single input device or with two input devices. The input devices may be any suitable input device such as a virtual reality hand controller or gloves with that are associated with the virtual environment though any suitable means such as sensors. In some embodiments the input device may include a single select button or alternatively, the input device may have multiple buttons that have different functionality. The inputs alter the operation of the computers for example, by selecting where each user resides, or the action the user takes such as, for example using the select menu, or grabbing tools or parts, etc, including the output display by each of the output devices (first virtual reality device 104, display output 2700, and machine display 116). For example, an input from the first input device 106 to the first computer 102 may generate or alter the virtual environment (on first virtual reality device 10). A control signal generated by the software on the computer is then sent to the second computer 108 and the third computer 114. Each computer then may display the altered virtual environment to their respective display output device, 110 and 116, respectively. One or more of the computers may store virtual device representations of physical devices (for example purposes only equipment such as biotech equipment, machinery, industrial equipment, or any other device that may be disassembled), their parts or components, virtual tools such as hand tools for manipulating objects such as screw drivers or wrenches or general tools such as voltmeters or other measurement devices and the like, and associated information, such as component information, which components each virtual tool may operate upon, etc., images, virtual technical manuals, video feeds, constraining relationships, etc. In some embodiments, storage of virtual devices, components, virtual tools, and associated information may be performed by another virtual reality device and send the requested virtual device, component, etc. to the computer(s). One of the computers may operate as a host to a virtual environment (and thus generating the virtual environment) or the virtual environment may be hosted on another server or network, including cloud-based networks. In an alternate embodiment, the virtual devices themselves may host the virtual environment. Each computer may display features that are not shared within the virtual environment, such that they are unique to a specific user, but are displayed on the display output device associated with that computer. For example, if one user is pointing to a menu with a selection input device, the same menu would not be displayed to another user. In some embodiments, the first computer 102 may display a selection input indicator on the first virtual reality device 104, but not send a control signal to the second computer 108 and the third computer 114 to display the selection input indicator. In other embodiments, the first computer 102 may send the control signal to the other computers.

The first virtual reality device 104, the second virtual reality device 110, and the machine display 116 are exemplary display output devices that may be utilized in the computing environment 100. The display output devices may receive controls signal from their respective computers to display the virtual environment and additional features. The display output devices may include monitors, virtual reality enabled headsets, augmented reality projectors, or other devices capable of displaying a virtual reality environment. The virtual reality devices may also be utilized as input devices. For example, the direction the virtual reality device is facing relative to a reference direction may be utilized as an input.

The first input device 106, the second input device 112, and the third input device 118 receive inputs from a user, machine, or other device. The input devices may be configured to receive haptic inputs, mechanical inputs, audio inputs (including voice inputs), gesture recognition input, eye tracking input, etc. In some embodiments, the display output device may be the input device, such as for an eye tracking input. The inputs may include selection inputs, inputs to alter the location of a selection input indicator, inputs to alter the location of a point of reference, movement inputs, etc. A selection input may be an input from the input device that operates on the virtual environment at the location of the selection input indicator within the virtual environment. A selection input may alter an instanced device, remove a component from a device, highlight a component, initiate a pre-determined script, start a test, restart the training program, or identify a specific time point in a training simulation, etc. Movement of the input device may alter the location of the selection input indicator within the virtual environment. A movement input may result in altering the position and view of a user representation within the virtual environment. The user representation may remain stationary while the virtual environment is altered, which alters the apparent position and view of the user representation. Each user representation instanced within the virtual environment may have an associated point of reference. The point of reference is utilized to move or rotate the instanced devices and the virtual environment relative to the user representation while maintaining the user representation stationary. The point of reference may be the user representation, the location in the virtual environment associated with the user representation, a predefined location relative to the user representation, etc. The predefined location may be a predefined distance and a predefined height from the user representation. Each user representation has its own point of reference about which a movement input is defined, which may be altered.

The operation of and corresponding display outputs of the computing environment 100 are further described in reference to FIG. 2-FIG. 27.

Referring to FIG. 2-FIG. 27, various display outputs and virtual environments are depicted. The display output 200 corresponds to a user representation instanced in the virtual environment. The display output 200 depicts a virtual environment with a virtual device 202, a virtual tool 204, a user representation location indicator 206, and a user representation location indicator 208. In some embodiments, only one user representation location indicator will be present such as when a single user has entered the virtual reality user environment. The user representation location indicator 206 and the user representation location indicator 208 may be a 2D or 3D image or collection of pixels at a location associated with the each of the other user representations. The user representation location indicator 206 and the user representation location indicator 208 may provide an indication of the display output for the associated computer and output device, such as the direction of their view. The selection input indicator 210, as a representation of the user input device, is associated with the user representation currently displayed and may move within the virtual environment corresponding to the movement of an input device. The virtual environment further comprises a background image 212. A point of reference 214 is displayed for the current user representation. Each other user representation may have their own point of reference. In some embodiments, there may be two users operating in a collaborative training environment. In some embodiments, there may be a collaborative training environment where a user interacts with a computer controlled secondary user who is pre-programmed to assist the first user.

The virtual device 202 may be a digital representation of a real or physical device. The virtual device 202 may operate in the virtual environment as the real device would in a real environment. More than one virtual device may be instanced into the virtual environment, including differing types of virtual device or similar types of virtual device. The virtual device 202 may comprise one or more components, parts, or pieces, such as the one or more components 702, as shown in FIG. 7. The one or more components 702 may receive a selection input, which may activate that component and enable movement of the component by further inputs, such as a movement input, by the user representation that activated the component. In some embodiments, once the component is selected, the component will move independently to a predetermined location, for example purposes only, off to side or top some predetermined distance away. Alternatively the component may move into an inventory storage that keeps track of all the components selected. In some embodiments, activation of a component may be limited to fewer user representations than those instanced in the virtual environment. The selection input indicator 210 is utilized to determine which device, component, or tool receives the selection input. The selection input indicator 210 may be at a predefined location from the location of the user representation within the virtual environment. The predefined location may be a predefined distance and a predefined height from the user representation. The selection input indicator 210 may also be moved within the virtual environment based on the movement of an input device.

The virtual tool 204 may correspond to a real tool or to a representational tool, for example a generic screw driver body with non-specified head type (phillips vs flat-head) and may be instanced within the virtual environment. The virtual tool 204 may be activated, similar to a component, by a selection input, such as the virtual tool 704, as shown in FIG. 7. Such a selection input may enable the virtual tool 204 to be moved within the virtual environment. In some embodiments, a further selection input may be utilized to de-select the tool, which may remain at the location in the virtual environment where it was located when de-selected, or may move to its pre-first selection input, or may be removed from the virtual environment. The virtual tool 204 may also be utilized to be operated on the one or more components 702, as shown in FIG. 7. A virtual tool 204 that has been selected by a selection input may be moved to a component. In some embodiments, the device may be moved in relation to the tool. When the selection input indicator 210 with the activated virtual tool 204 is associated with a component, the virtual tool 204 may operate on that component by a selection input. For example, a virtual tool 204 that is a screwdriver may be utilized to operate on a component. If the component is a screw, the screw may be unscrewed or screwed-in based on the state of the component when the selection input occurs. Alternatively, motion sensors associated with the selection input controlling the virtual tools may detect the movement by the user, such as rotating the hand associated with the selection input either right or left which would mimic an action such as screwing or unscrewing a screw for example. In some embodiments, each virtual tool 204 may be associated with a number of components that activate a state change in the virtual environment by selection input.

The user representation location indicator 206 and the user representation location indicator 208 are depictions of other users within the virtual environment. The user representation location indicator 206 and the user representation location indicator 208 may move due to a movement input to the computer controlling that user representation. The user representation location indicator 206 and the user representation location indicator 208 may also perform other actions that alter the virtual environment, such as selecting and moving components and virtual tools. As depicted in the display output 200, the user representation associated with the user representation location indicator 206 has selected the virtual tool 204, and the virtual tool 204 is associated with the selection input of the user representation associated with the user representation location indicator 206. In some embodiments, one or more user representations may be able to interact within the virtual environment or with the virtual tool. For example, if a first user cannot disassemble the virtual device, a second user representation may interact with the first user representation as an assistant, such as by handing tools to the first user representation or by activating a component. In some embodiments, the first user can then reset the device so that the user can perform the same action or actions without assistance. In some embodiments, one or more user representations may be inhibited from interacting with the virtual environment. For example, those user representations may move within the virtual environment, but not interact with the virtual device 202 or the virtual tool 204.

The background image 212 may be applied to the edge of the virtual environment. The background image 212 may be selected, or a default background image 212 may be instanced when the virtual environment is instanced. The background image 212 may be associated with the virtual device 202 and be instanced when the virtual device 202 is instanced within the virtual environment. The background image 212 may be altered by instancing further virtual devices. In some embodiments, there may not be a background image.

Figure 3:
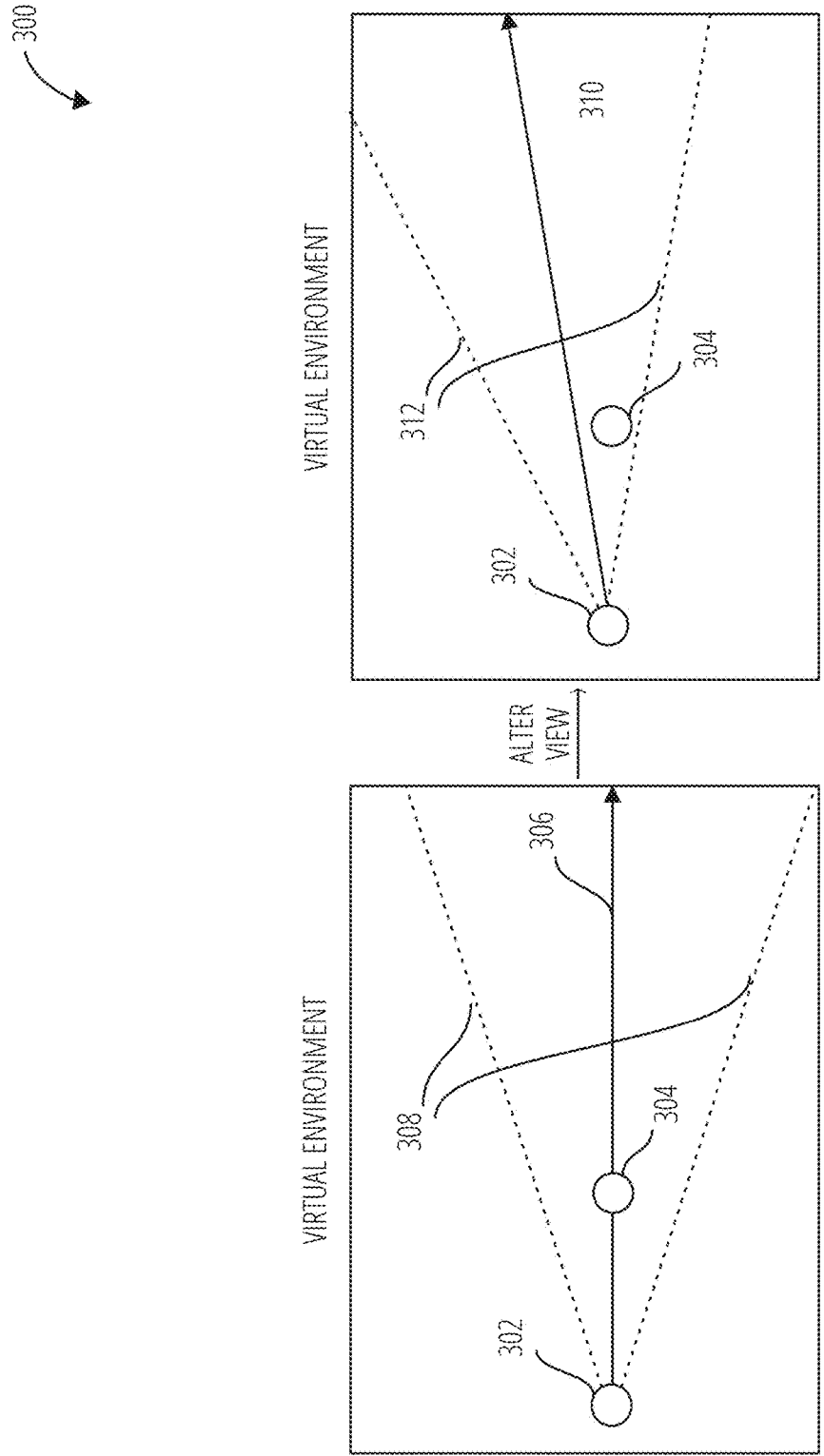
FIG. 3 illustrates multiple embodiments of a side view of a virtual environment 300.

In some embodiments, the system may include a point of reference 214. The point of reference 214 may be a location in the virtual environment which orients the user and determines the field of view of the user. In some embodiments, the point of reference 214 may be utilized indicate movement within the virtual environment and determine the field of view of the virtual environment in the display output. The location of the point of reference 214 may be based on the location of the user representation. The point of reference 214 may be a predefined distance and a predefined height from the user representation. In some embodiments, the point of reference changes as the user looks around the virtual environment. The point of reference may be specific to the user, for example, may be determined based on the height of the user. The location of the point of reference 214 may be altered based on an input, such as the direction the virtual reality device associated with the user representation is facing. For example, the virtual environment 300 as shown in FIG. 3 is depicted in two side views. The user representation 302 is in a first location within the virtual environment 300 and the point of reference 304 is at a predefined location from the user representation 302. The user representation 302 has a first viewing direction 306 through the point of reference 304 resulting in the first field of view 308. The point of reference 304 may appear in the center of the first field of view 308. An input may then alter the facing direction for example rotating or moving upward by an angle (e.g., 30 degrees). The second viewing direction 310 then results. For example, the second field of view 312 may have a point of reference 304 below the center as the point of reference 304 remained at the same location within the virtual environment relative to the user representation 302.

Figure 2:
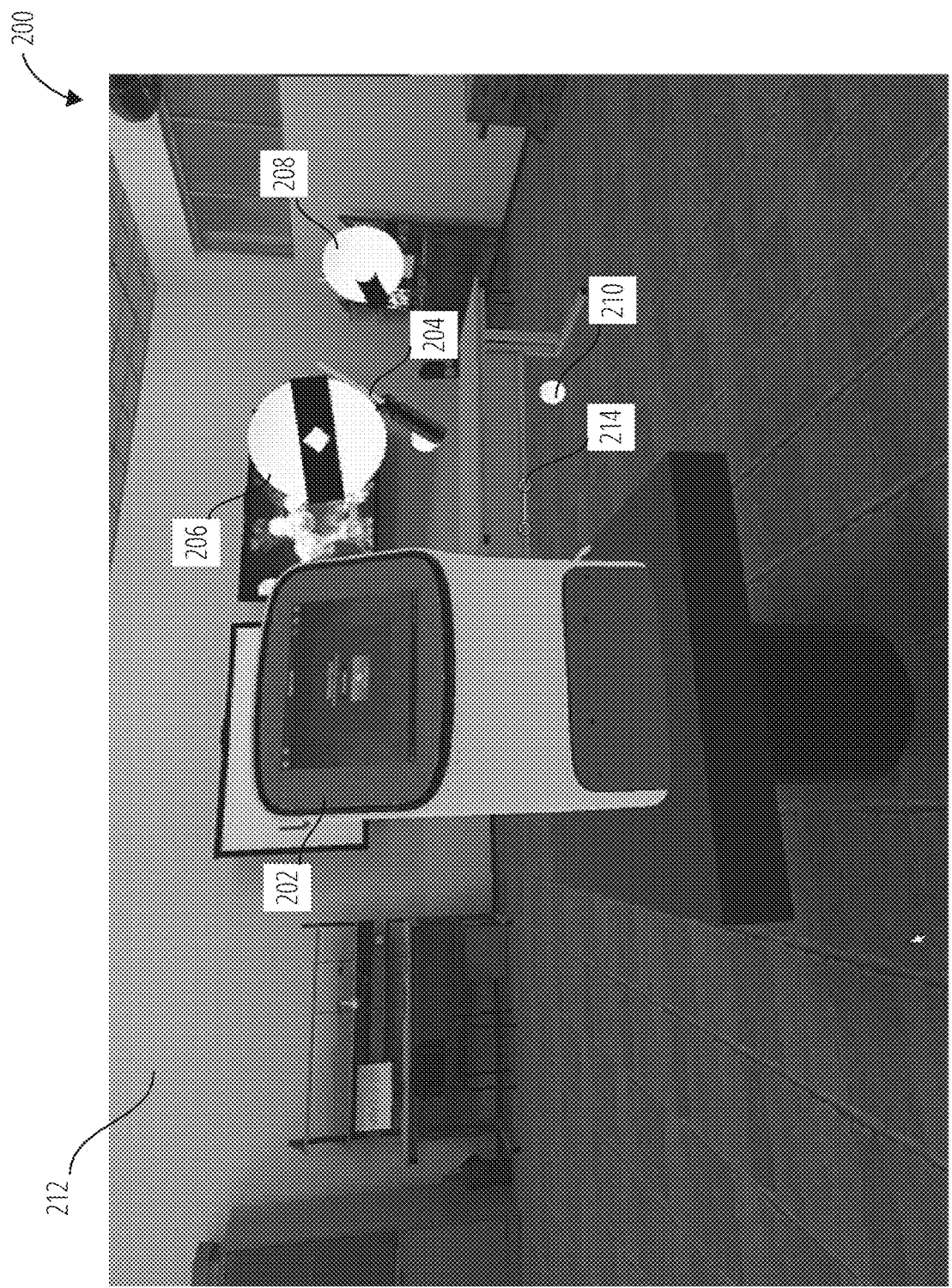
FIG. 2 illustrates an embodiment of a display output 200.
Figure 4:
FIG. 4 illustrates an embodiment of a display output 400.

In response to receiving a movement input, the point of reference 214 as seen in FIG. 2, is utilized as the point of reference for movement as depicted for example by the translation movement 402, as seen in FIG. 4, or rotation (the rotation movement 404) for the display output of the virtual environment. The virtual environment including the virtual device 202 is then moved, while the user representation remains stationary. The user representation location indicators may also be moved during a movement input.

Figure 5:
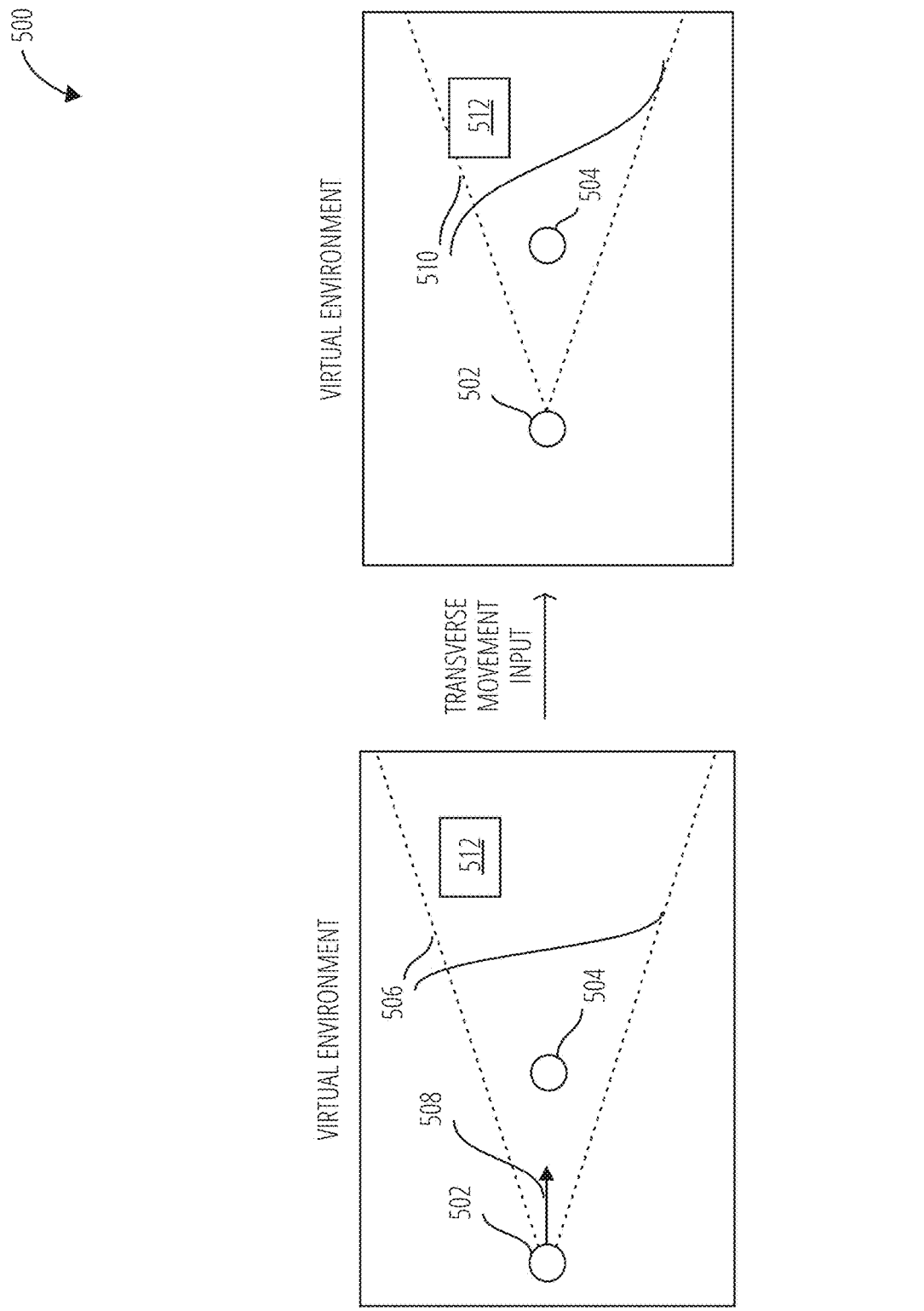
FIG. 5 illustrates multiple embodiments of a top view of a virtual environment 500.

As shown in FIG. 5, the virtual environment 500 may have a user representation 502 and a device 512 instanced. The user representation 502 has an associated point of reference 504 and first field of view 506. A translation movement input 508 may be received to alter the display of virtual environment 500 from the first field of view 506 to the second field of view 510. The direction of the translation movement may be along a line (or vector) from the user representation 502 through the point of reference 504. The magnitude of the translation movement may be determined by the input received, such as the duration of a button press, the force applied to a haptic receiver, etc. The field of view may progress through various states to proceed from the first field of view 506 to the second field of view 510. The rate of display of these fields of view may be alterable and may be based on optical sensitivity to motion.

Figure 6:
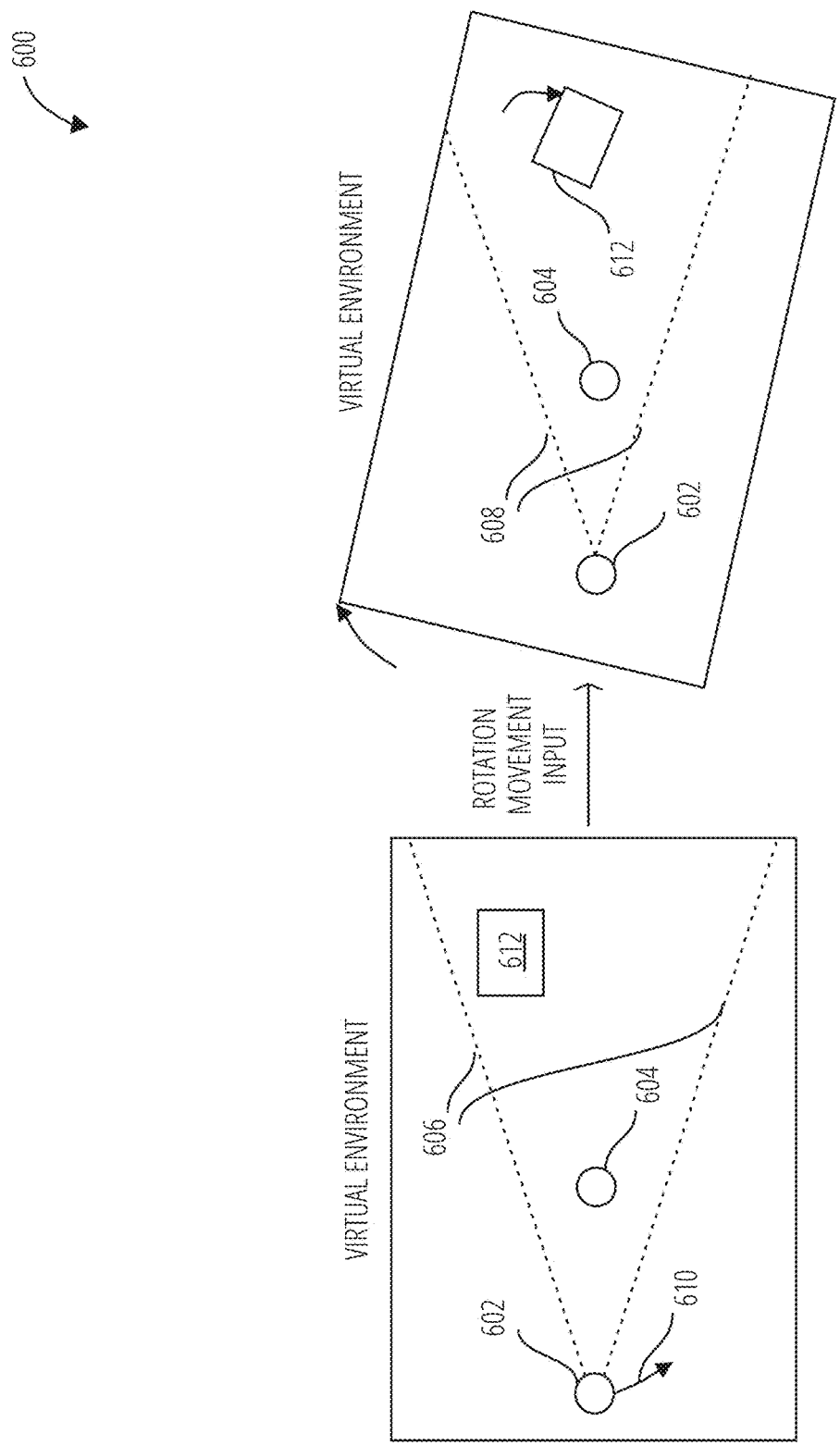
FIG. 6 illustrates multiple embodiments of a top view of a virtual environment 600.

The virtual environment 600 may have a user representation 602 and a device 612 instanced, as shown in FIG. 6. The user representation 602 has an associated point of reference 604 and first field of view 606. A rotation movement input 610 may be received to alter the display of virtual environment 600 from the first field of view 606 to the second field of view 608. The rotation movement input 610 then alters the virtual environment to rotate about the point of reference 604 such that the user representation 602 appears to follow an arc of a radius based on the predefined distance of the point of reference 604. In some embodiments, the user may move in the virtual space while the virtual environment remains stationary such as if the user is located in a virtual room with a projected lab environment. In some embodiments, the user representation 602 may remain stationary, and the virtual environment 600 is rotated. In such an embodiment, the rotation of the virtual environment may decrease the potential for motion sickness to the user. Additionally, in such an embodiment, the user may also use the virtual environment in a seated position. A transform of the rotation movement input 610 may be performed for each point in the virtual environment to determine the arc that each of those points follow. Instanced devices, tools, user representation location indicators, etc. may also be rotated in such a manner. The magnitude of the transverse movement may be determined by the input received, such as the duration of a button press, the force applied to a haptic receiver, etc. The field of view may progress through various states to proceed from the first field of view 606 to the second field of view 608. The rate of display of these fields of view may be alterable and may be based on optical sensitivity to motion.

As shown in FIG. 7, the one or more components 702, such as the components of an instrument or device, such as instrument for performing a biological application such as sequencing, PCR, capillary electrophoresis, gels, DNA synthesis or DNA isolation, bioreactors and rocker bags, freezers and refrigerators, or any other machinery, device, or mechanical system that may be disassembled, may have associations with or may be mechanically coupled to each other, such as attachments to other components of the one or more components 702. Some of the one or more components 702 may also have constraining relationships with other of the one or more components 702. In such constraining relationships, the constrained component is not able to be removed from the virtual device 202 until the constraining component is removed. However, an input may be received such that an exploded view, as shown in the display output 700, may disable the constraining relationships. In some embodiments, the constraining relationships may be utilized to determine the spatial configuration of the one or more components 702 within the virtual environment in the exploded view.

As shown in FIG. 8, the virtual tool, such as the virtual tool 804 may be transferred from one user representation to another user representation. The user representation associated with the user representation location indicator 802 may activate a selection input to select the virtual tool 804. Movement inputs from either the user representation associated with the user representation location indicator 802 or the user representation associated with the selection input indicator 806 may result in the selection input indicator 806 being able to select the virtual tool 804. A selection input may then be performed by the selection input indicator 806 to associate the virtual tool 804 with the selection input indicator 806. In some embodiments, a further de-selection input at the computer or related input device associated with the user representation location indicator 802 may be performed to transfer the virtual tool 804. Exemplary tools include screwdrivers, wrenches, measuring tools, etc.

Figure 10:
FIG. 10 illustrates an embodiment of a display output 1000.
Figure 11:
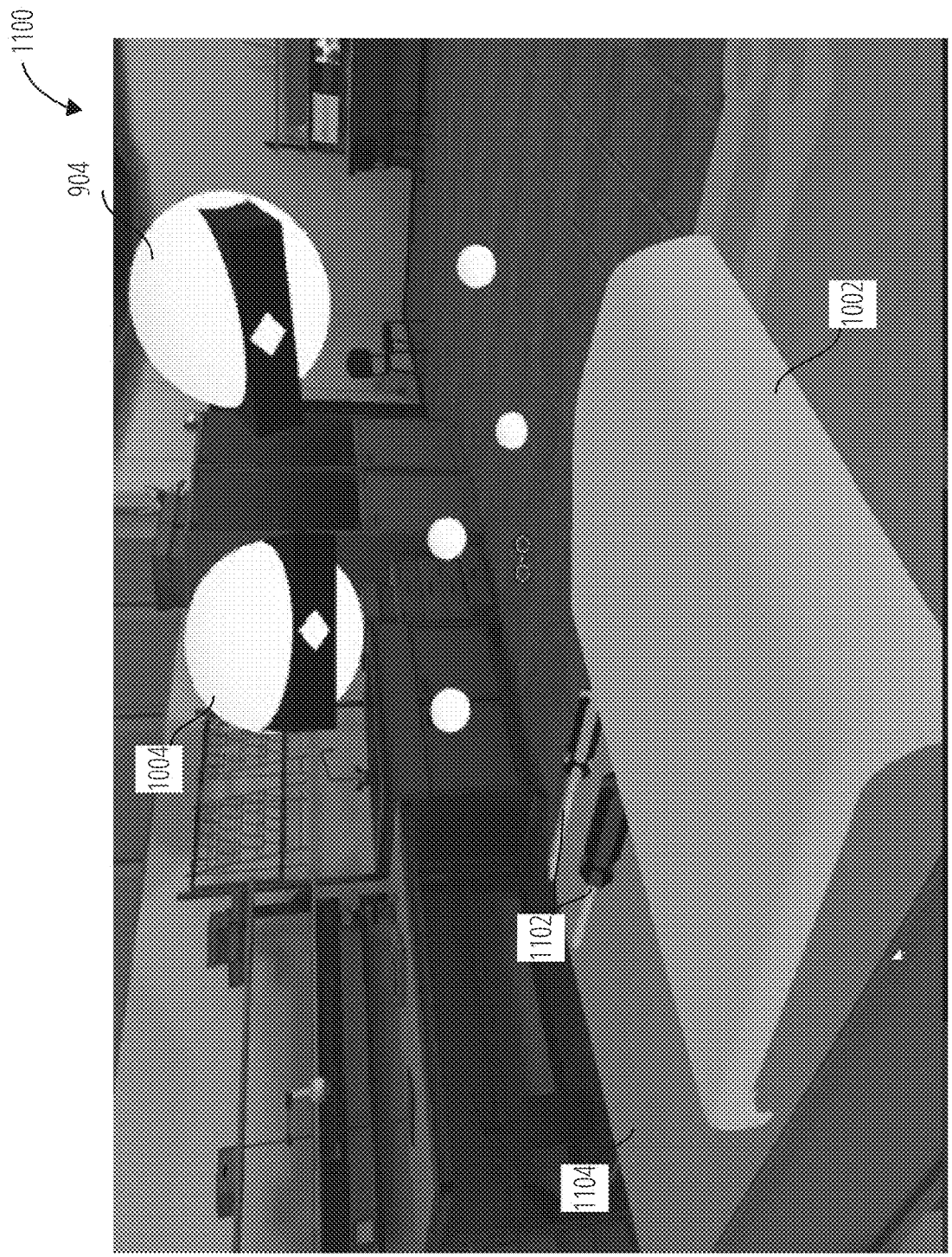
FIG. 11 illustrates an embodiment of a display output 1100.
Figure 12:
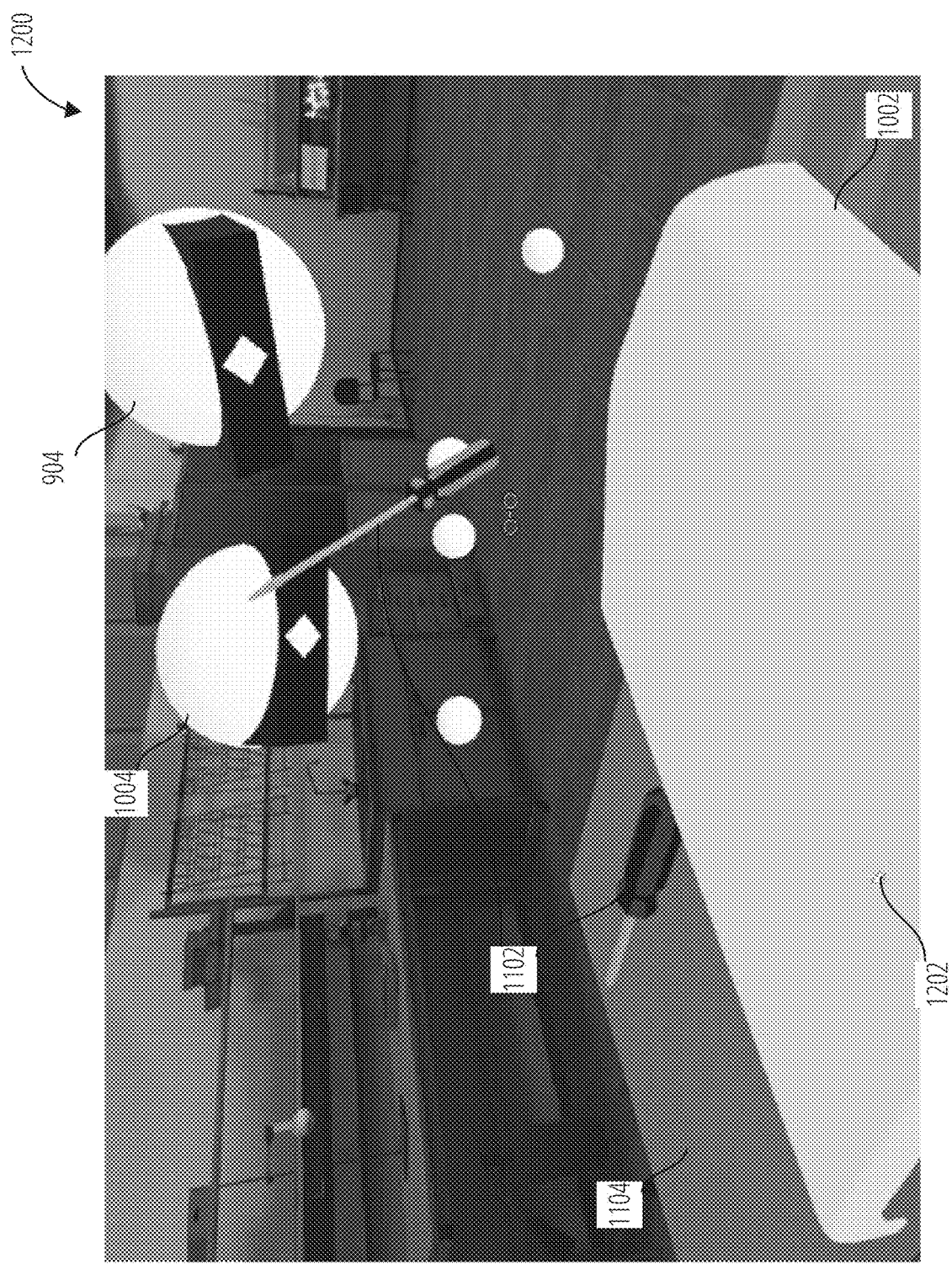
FIG. 12 illustrates an embodiment of a display output 1200.
Figure 13:
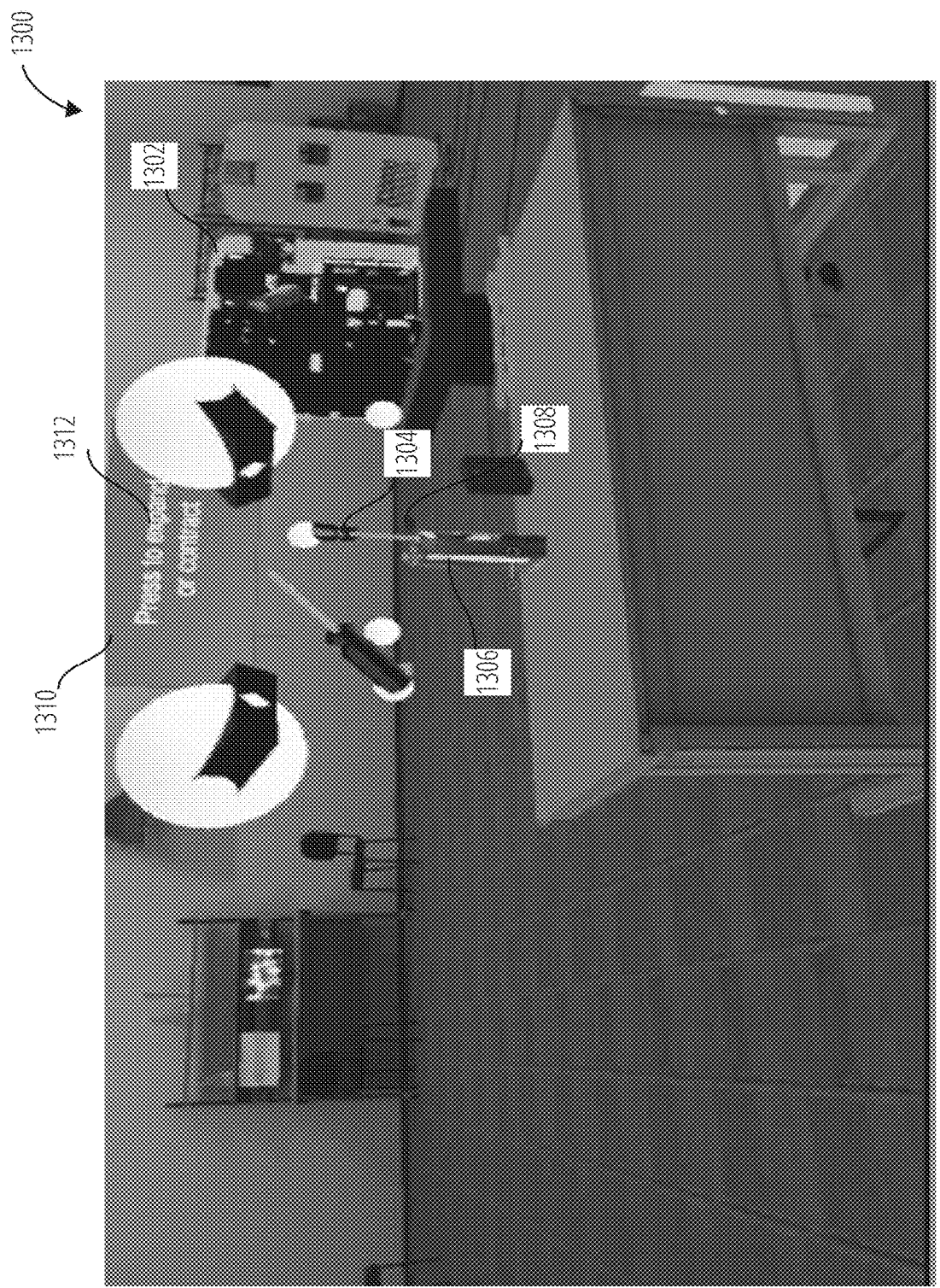
FIG. 13 illustrates an embodiment of a display output 1300.

One embodiment of a session is described in FIGS. 9, 10, and 11. The display output 900 as shown in FIG. 9, the display output 1000 as shown in FIG. 10, the display output 1100 as shown in FIG. 11, and the display output 1200 as shown in FIG. 12 depict various states of the virtual environment resulting from inputs to the virtual environment by the computers (such as the first computer 102, the second computer 108, and the third computer 114) associated with the instanced virtual environment. The virtual device 902, the user representation location indicator 904, the user representation location indicator 1004, the virtual tools 1102, and the virtual table 1104 may be instanced by into the virtual environment by the actions of one or more computers. The display outputs are associated with a user representation of one computer, and the view is alterable by a movement input or altering the direction that the virtual reality device is facing. The user representation associated with the user representation location indicator 904 performs a selection input to select the component 1002 of the virtual device 902. The user representation associated with the user representation location indicator 904 then performs movement inputs to move the selected component 1002 to the virtual table 1104. The computer associated with the display outputs receives movement inputs and virtual reality device facing inputs to maintain the user representation location indicator 904 and the component 1002 in the view of the display output. The user representation location indicator 1004 is then viewable. The computer associated with the user representation location indicator 904 receives a de-selection input to place the component 1002 on the virtual table 1104, which may interact with the component 1002. The interaction may result in the component 1002 being placed in a specific orientation or alternatively, the user may decide on the orientation and positioning of the component. The computer associated with the user representation location indicator 904 receives a selection input to select one of the virtual tools 1102. The computer associated with the display output receives an input to associate the selection input indicator 1202 with the component 1002, resulting in an indication of that action (highlighting the component 1002, for example, with color such as yellow).

The virtual device may be maintained in a disassembled state, such as the virtual device 1302, when a component(s) is removed from the virtual device 1302 as shown in FIG.

13. The disassembled state of the virtual device 1302 resulted from the removal of components of the virtual device 1302, including the component 1306, which was removed by the action of the selection input indicator 1308 and further movement inputs or input device inputs to re-locate the component 1306 within the virtual environment. The removed component 1306 may still be operated on by the virtual tool 1304. The component 1306 may also be associated with the component information 1312 that is displayed on an information plane 1310. In some embodiment, the component information may be accessible through a menu located to the periphery of the virtual environment. The information plane 1310 and component information 1312 may be displayed when the component 1306 is selected or able to be selected by the selection input indicator 1308. The location of the information plane 1310 may be based on the component selected, the user representation, the detected location that a user is viewing within the display output device, etc. The component information 1312 may be displayed on the information plane 1310 based on the selected component, virtual tool, virtual device, or a combination thereof, etc.

Figure 14:
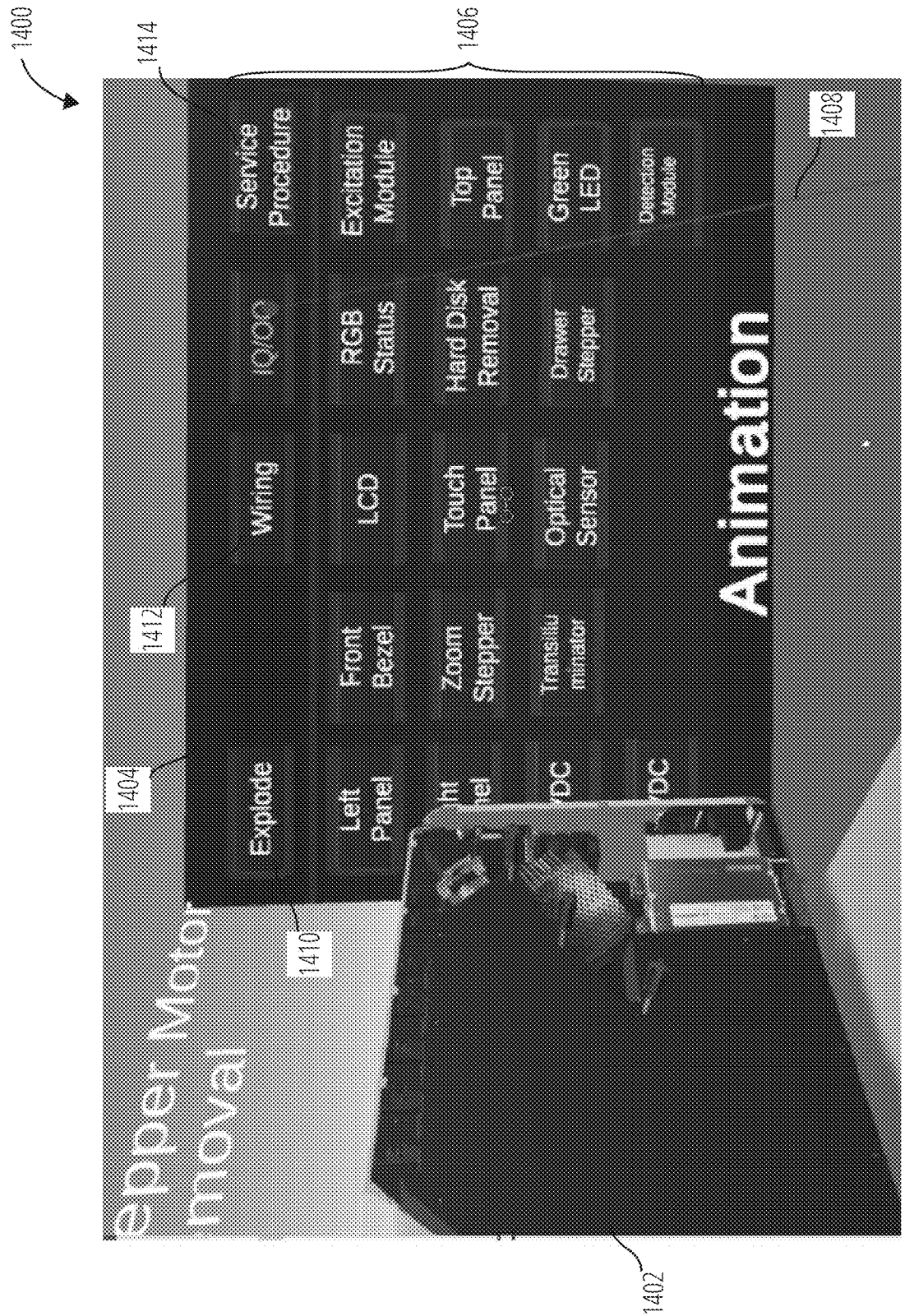
FIG. 14 illustrates an embodiment of a display output 1400.

The virtual device, such as the virtual device 1402, may have an associated menu 1406 displayed on the information plane 1404 as shown in FIG. 14. The menu 1406 may be superimposed on the information plane 1404. The information plane 1404 and the menu 1406 may be instanced based on a selection input. The information plane 1404 and the menu 1406 may also be instanced in response to a detection that the user is viewing a location in the virtual environment for more than at least a predefined threshold time period. The menu 1406 may include multiple controls that, when activated by a selection input, operate to alter the virtual device 1402. The selection input indicator 1408 may be utilized to determine the controller activated by the selection input. The controls include the exploded state selector 1410 that operates to alter the virtual device 1402 to an exploded configuration (or state). Once the exploded state selector 1410 (or any other control) is selected, the menu 1406 may present other controls, for example, an assembled state control. Further controls may be presented and operated by a selection input to expose hidden components, such as the hidden component selector 1412, present a pre-determined script for a procedure that may be performed on the virtual device 1402 by a selection input at the scene input selector 1414, highlight a component of the virtual device 1402, remove a component of the virtual device 1402, isolate (i.e., show only) a component, etc. The pre-determined script may display within the virtual environment a sequence of states of the virtual device 1402 that corresponds to the procedures. An exemplary procedure may be to remove a specific component for testing. The pre-determined script may proceed through various disassembled states of the virtual device 1402 until the specified component is removed.

Figure 15:
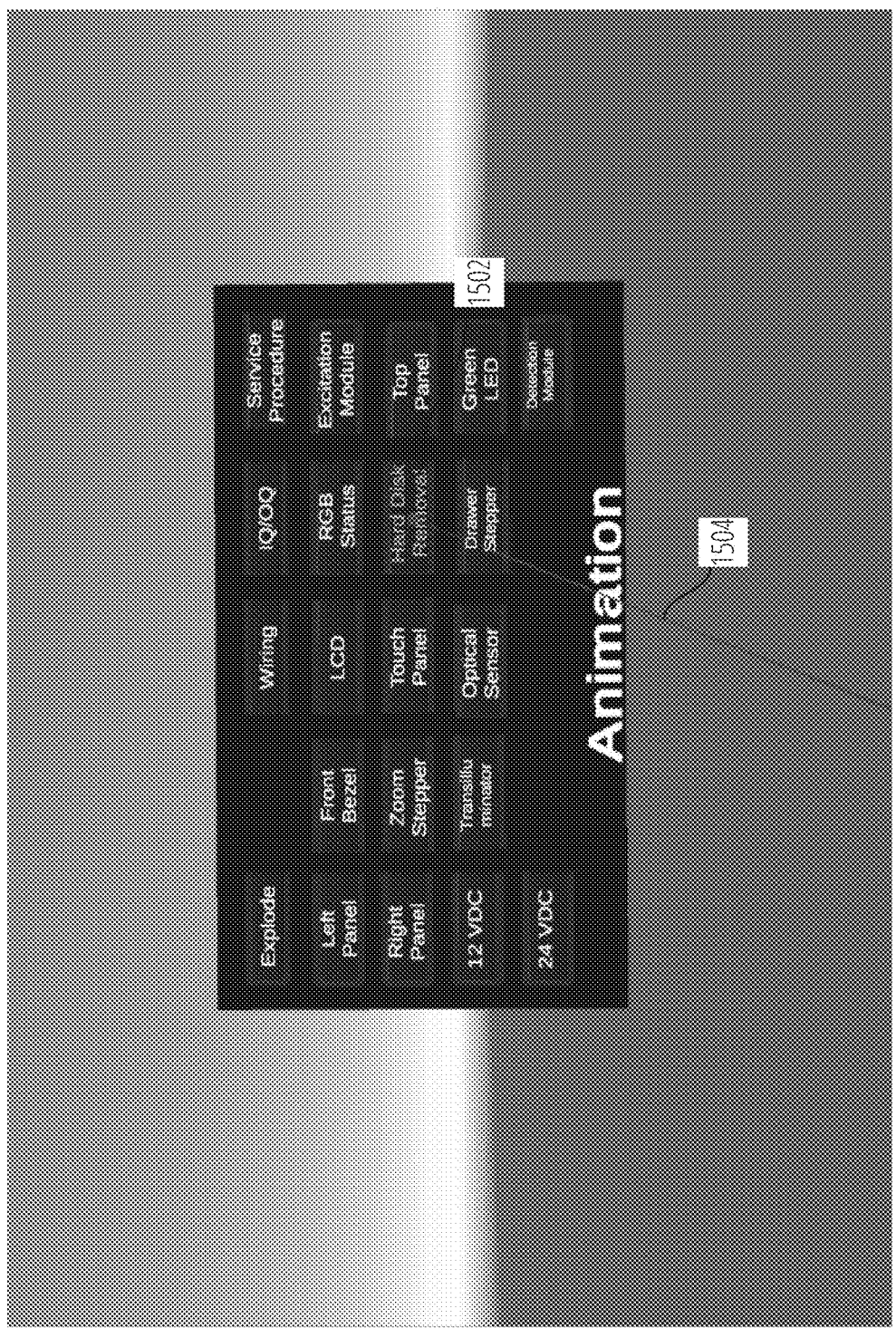
FIG. 15 illustrates an embodiment of a display output 1500.
Figure 16:
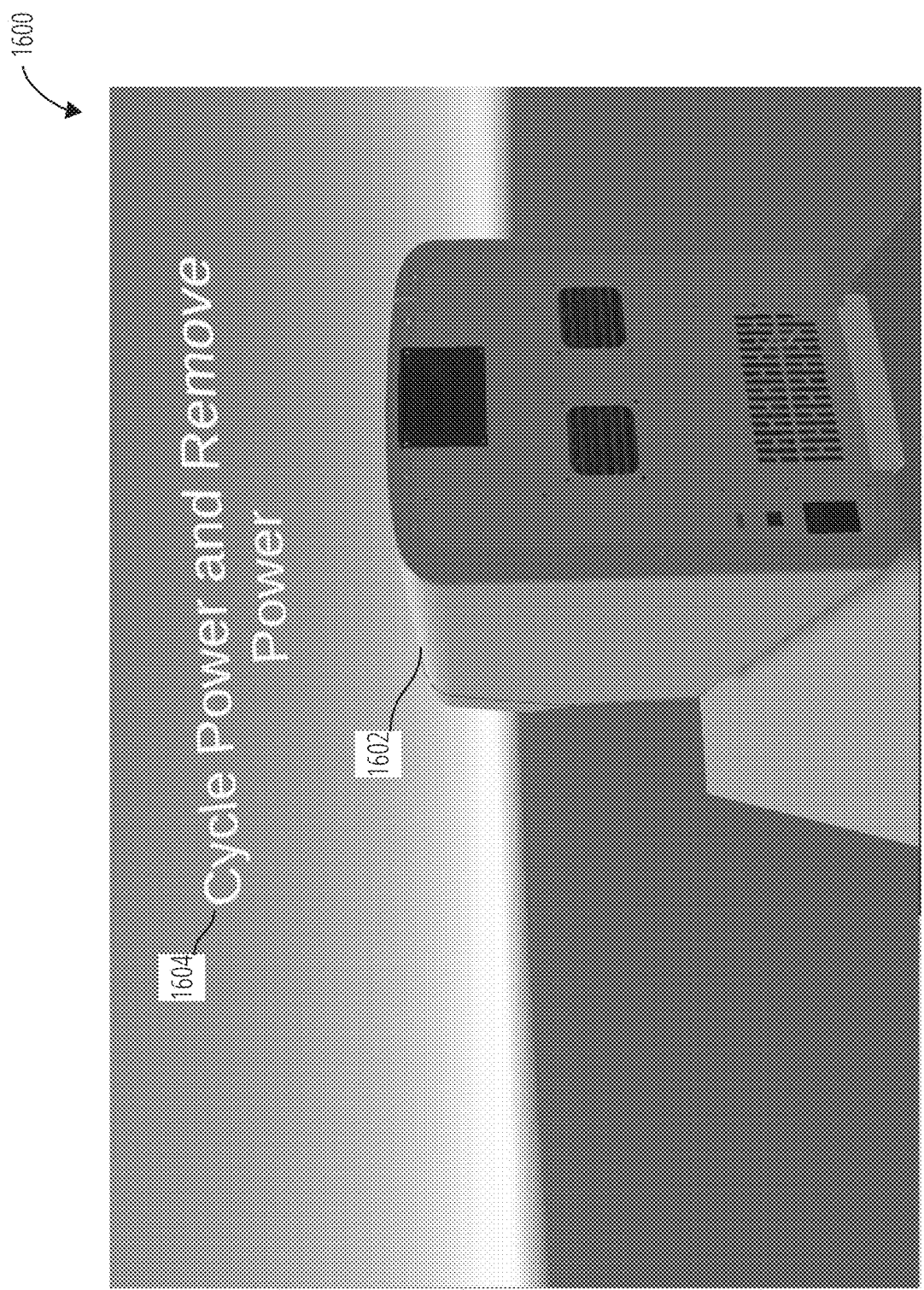
FIG. 16 illustrates an embodiment of a display output 1600.
Figure 17:
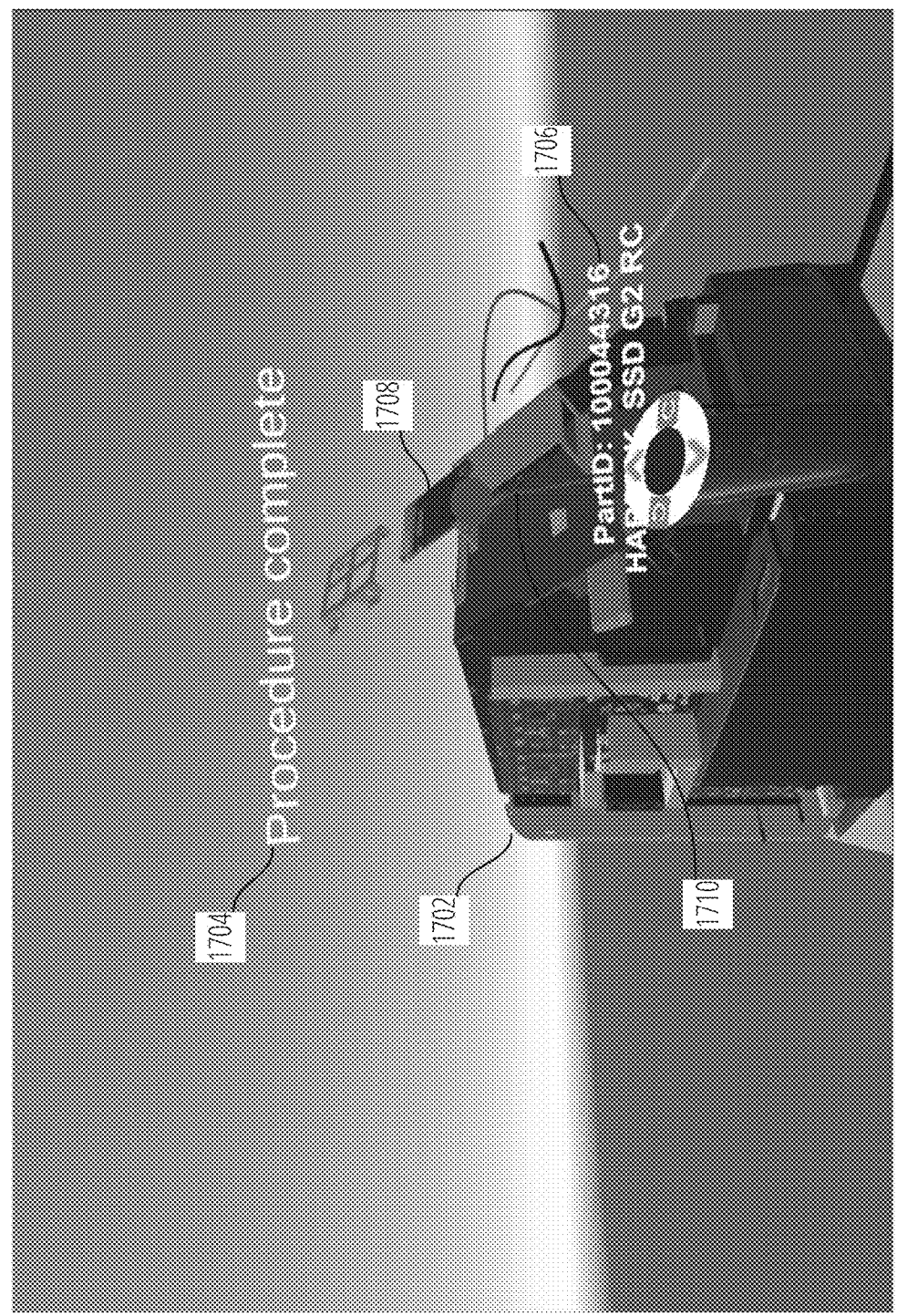
FIG. 17 illustrates an embodiment of a display output 1700.
Figure 18:
FIG. 18 illustrates an embodiment of a display output 1800.

As shown in FIG. 15, the display output 1500 depicts a menu with hard disc removal scene input selector 1502 that when receiving a selection input operates the system to perform a pre-determined script (i.e., receives a scene input). The scene input occurs at the selector at which the selection input indicator 1504 is pointed toward. The pre-determined script may instantiate the assembled virtual device 1602 and display an information plane 1604 with information associated with the pre-determined script, such as the current step in the pre-determined script as shown in FIG. 16. The pre-determined script may remove one or more components until the partially disassembled virtual device 1702 results as shown in FIG. 17. The components may be removed in a specific order, simulating a procedure that would be utilized on a real device. In some embodiments, the steps of the procedure may be displayed to the periphery of the device. Additionally, as the components are removed from the device, if the steps of the procedure are displayed, the current step maybe by highlight, such as for example by changing the color of the font. As the pre-determined script has progressed, the information plane 1704 may display other information based on the specific step within the pre-determined script. During the pre-determined script, component information 1706 for a component may be displayed for the selected component 1708 when the selection input indicator 1710 is associated with the selected component 1708 by, for example, movement of the input device. Other pre-determined scripts, such as that depicted in the display output 1800 as shown in FIG. 18, may display the current step 1802 and the next steps 1806. The component information 1804 and the component 1808 associated with the current step 1802 may displayed and highlighted, respectively. In other embodiments, the component information 1804 and the component 1808 that is highlighted is associated with the selection input indicator.

Figure 19:
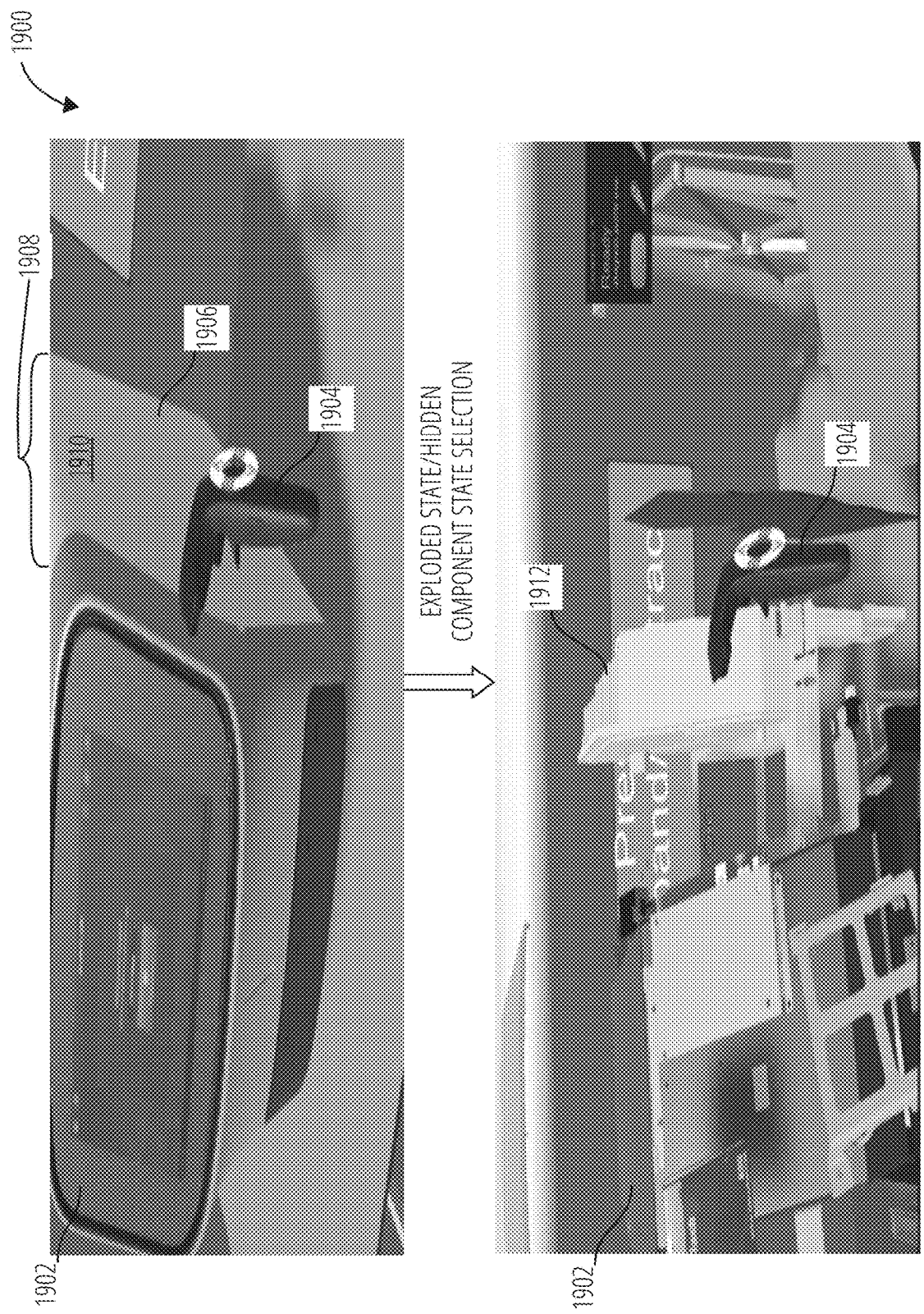
FIG. 19 illustrates an embodiment of a display output 1900.

The display output 1900 may depict multiple states of the virtual device 1902. For example, as shown in FIG. 19, the virtual device 1902 may first be displayed in an assembled configuration and then altered to an exploded configuration. While in the assembled configuration, the selection input indicator/virtual input device 1904 may be utilized to select the selected component 1906 as shown by the highlight 1908. The highlight 1908 is depicted as altering the color of the selected component 1906, for example altering the color to yellow; however, other representations may be utilized, including other colors (pink, red, green, different shades of grey, etc.), outlining the visible edges of the selected component 1906, etc. The selected component 1912 is not able to be selected in the assembled configuration. Utilizing the exploded state selector 1410 (or some other method), the virtual device 1902 is placed in the exploded configuration. The selected component 1912 may now be selected by the selection input indicator/virtual input device 1904.

Figure 20:
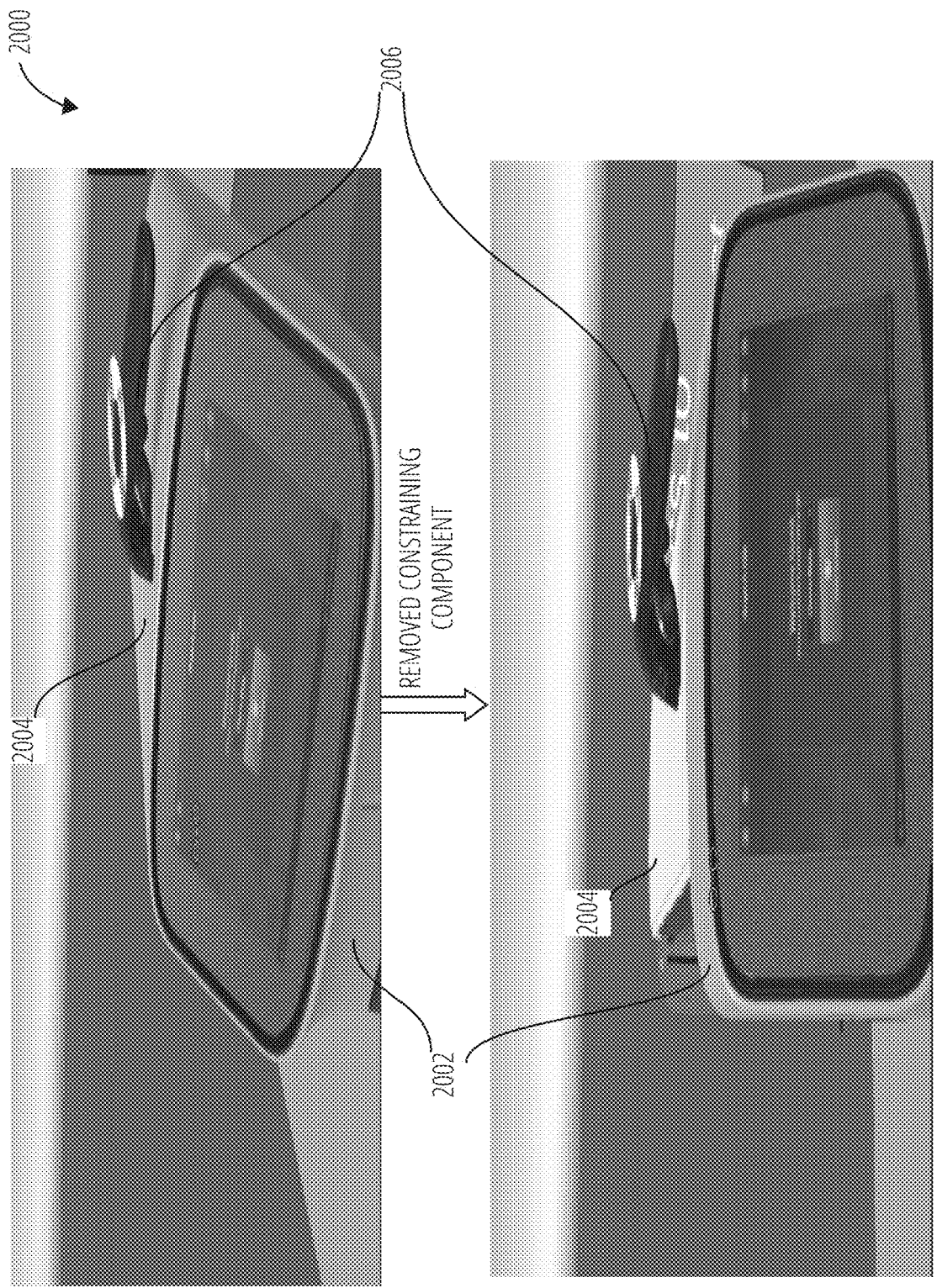
FIG. 20 illustrates an embodiment of a display output 2000.
Figure 21:
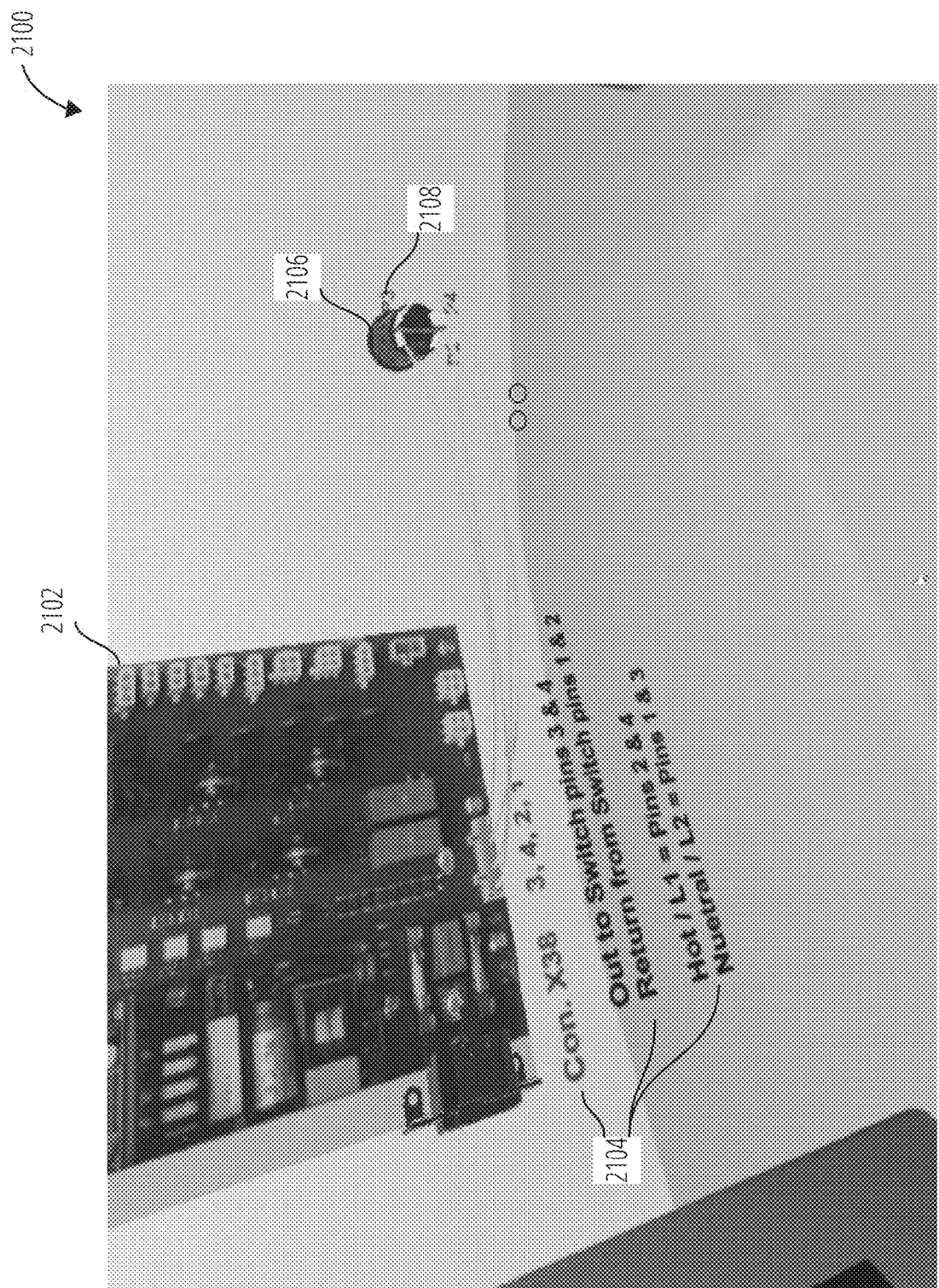
FIG. 21 illustrates an embodiment of a display output 2100.

As shown in FIG. 20, the virtual device 2002 may also have components, such as the component 2004, that are visible in the virtual environment, but unable to be selected by the selection input indicator 2006. The component 2004 may not receive a selection input (or the selection input may have no effect on the component 2004). The component 2004 may have one or more constraining relationships inhibiting its selection. Additionally, if a component cannot be disassembled further, the component may not receive a selection input. The component virtual device 2002 may be altered to remove the specific constraining relationships affecting the first component information 2104, as seen in FIG. 21. Here, the component 2004 is the top panel of the component 2102. The top panel is constrained by the side panels of the component 2102 (not depicted in constrained state at the top of page and removed in unconstrained state at the bottom of the page). Once the components of the virtual device 2002 have been removed, the first component information 2104 may be selected by the second component 2106 (depicted at bottom of page). The components with constraining relationships for the component 2004 (FIG. 20) may be removed by receiving a selection input followed by a movement input or input device movement, a selection input to a control on the menu 1406 (FIG. 14) corresponding to the component 2004 (FIG. 20), a selection input to a scene input selector 1414 (FIG. 14) to initiate a pre-determined script to place the virtual device 2002 in a state by which the component 2004 may be selected, etc.

Figure 22:
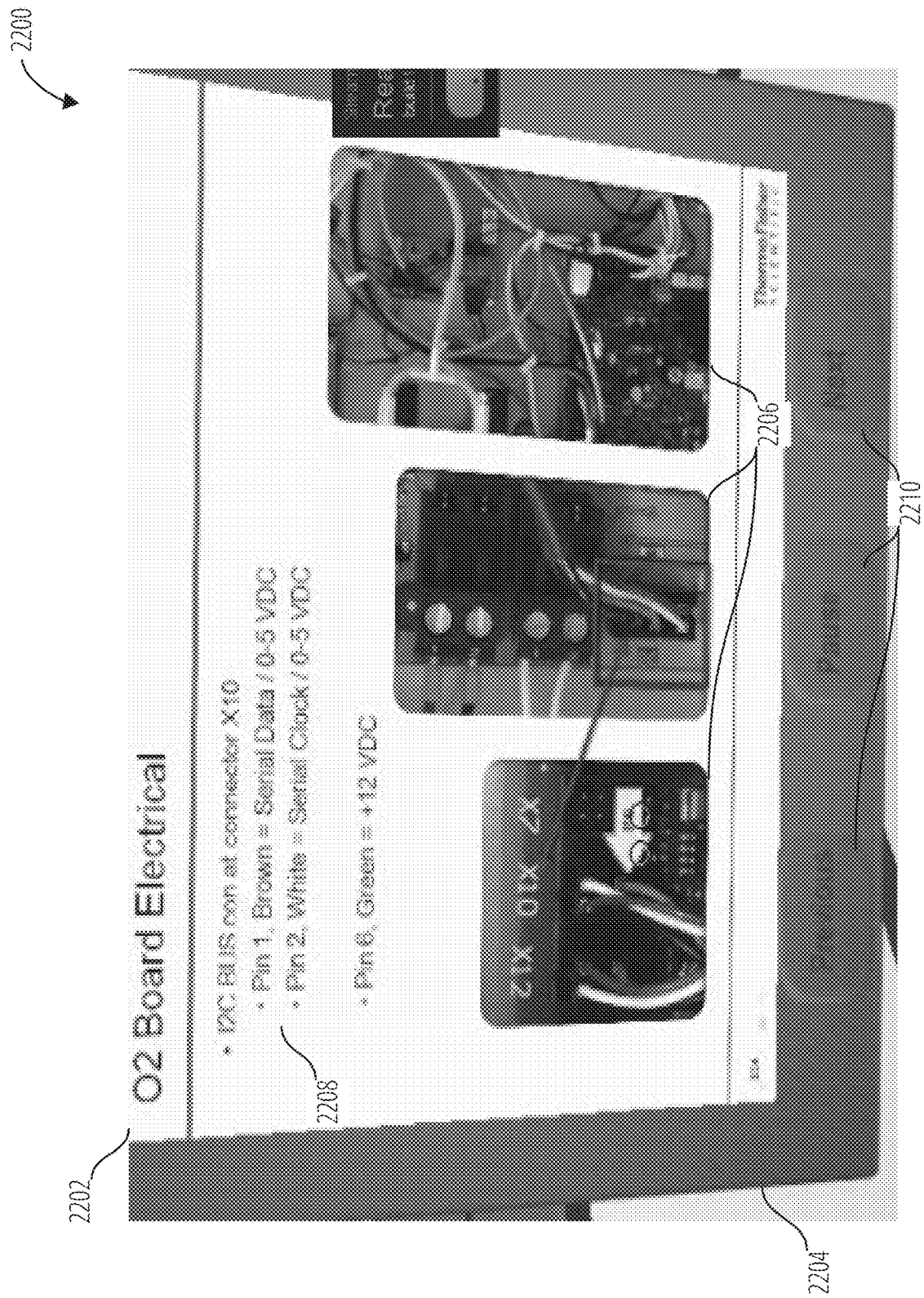
FIG. 22 illustrates an embodiment of a display output 2200.
Figure 23:
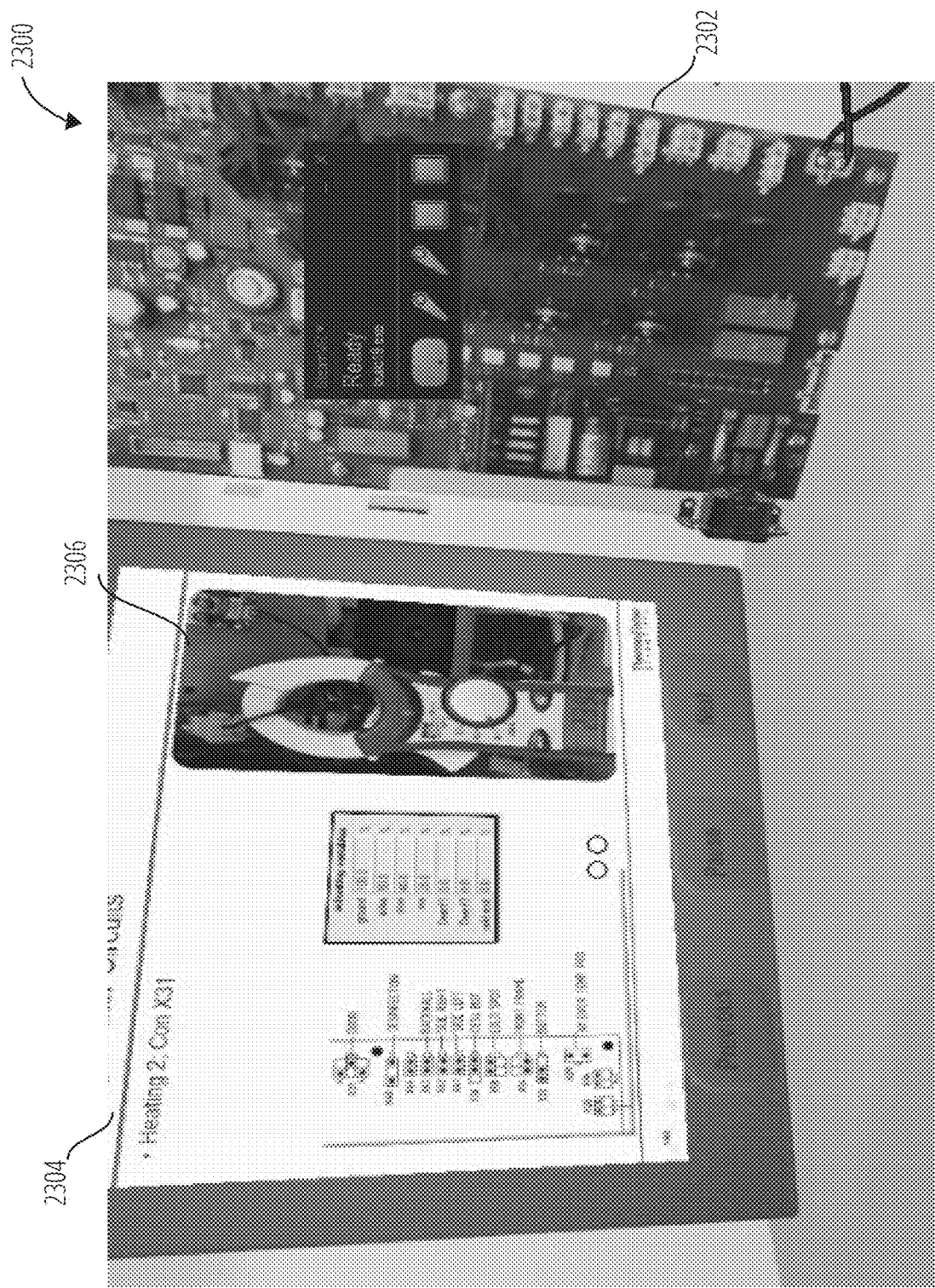
FIG. 23 illustrates an embodiment of a display output 2300.
Figure 24:
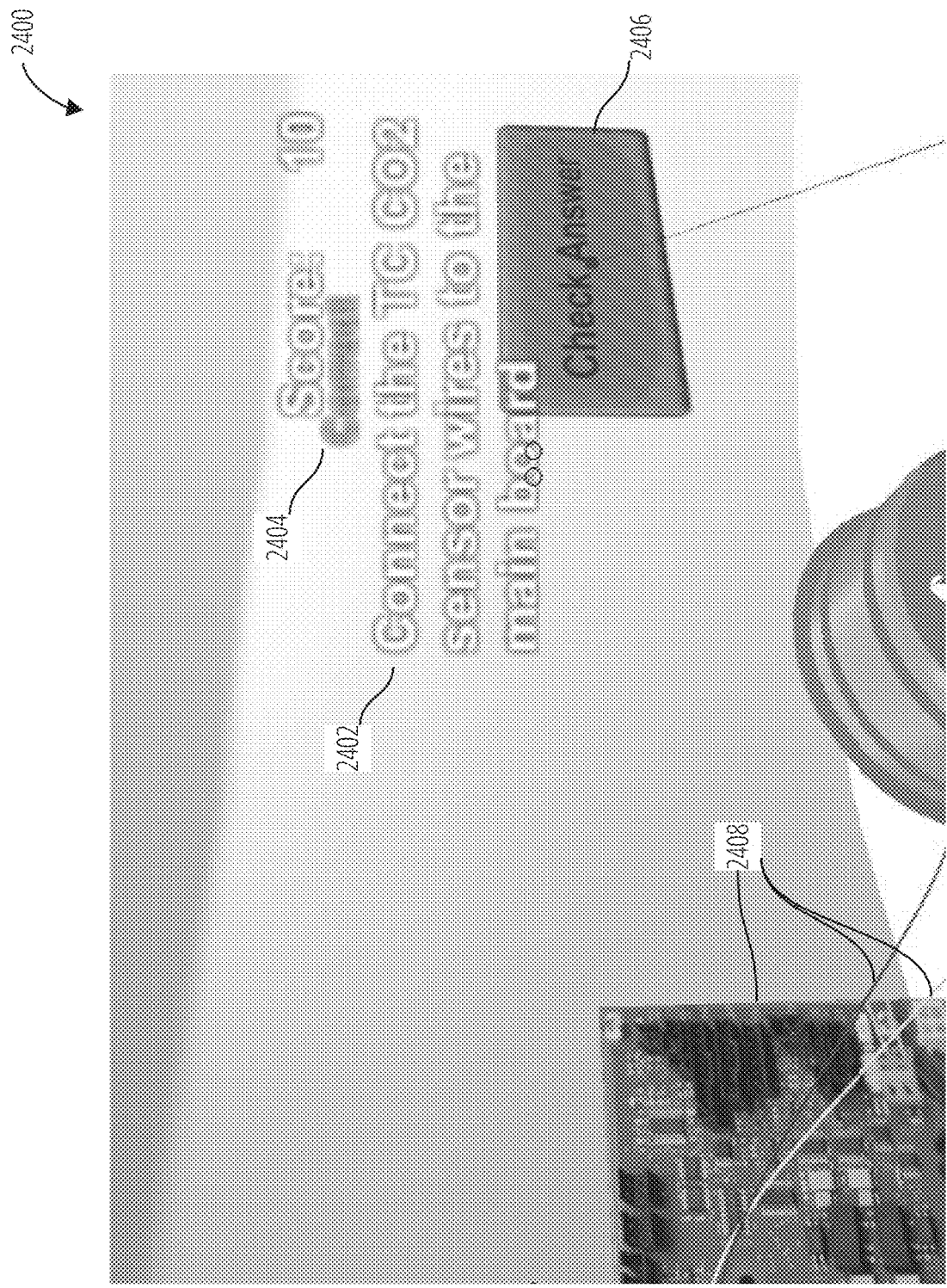
FIG. 24 illustrates an embodiment of a display output 2400.
Figure 25:
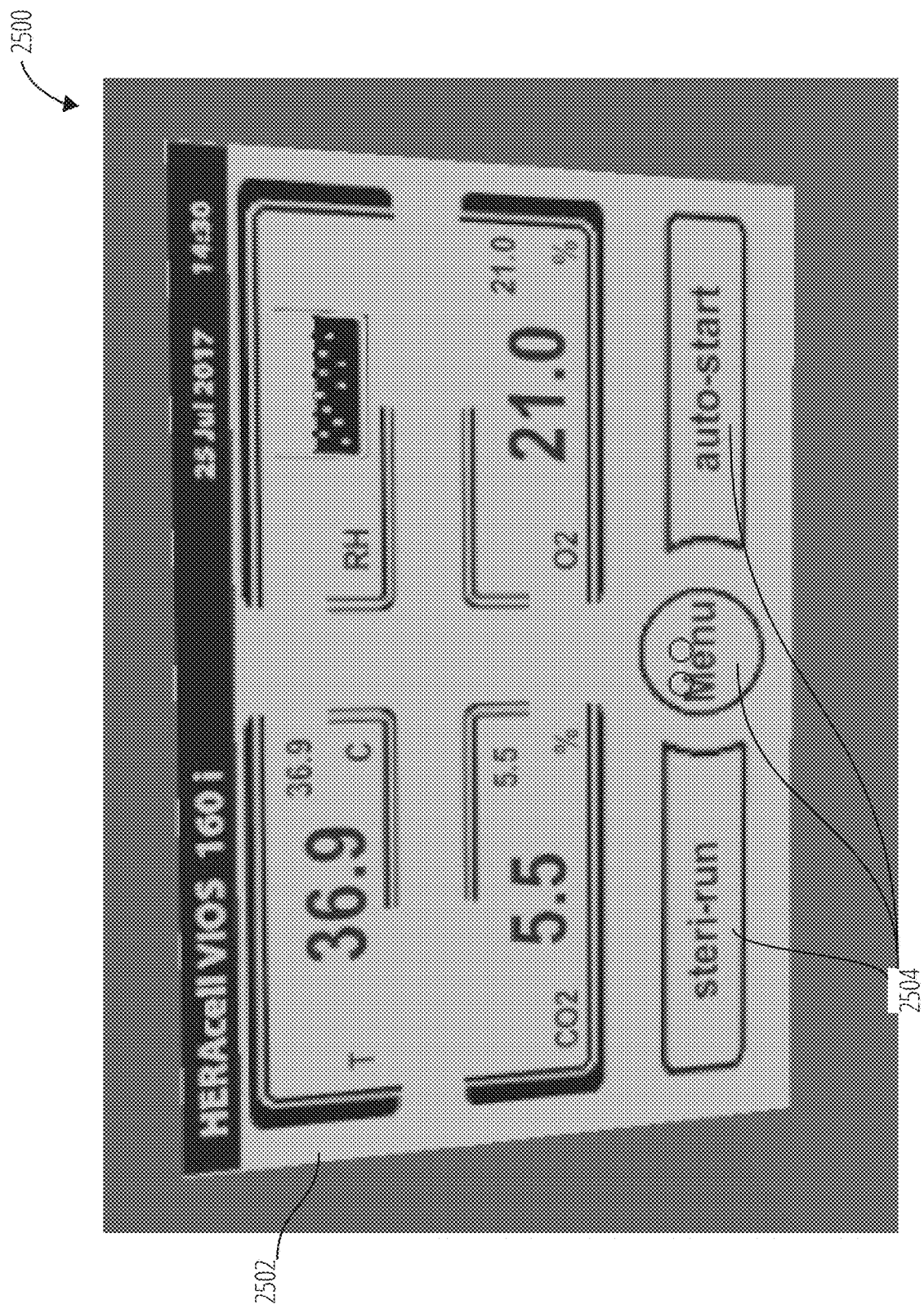
FIG. 25 illustrates an embodiment of a display output 2500.
Figure 26:
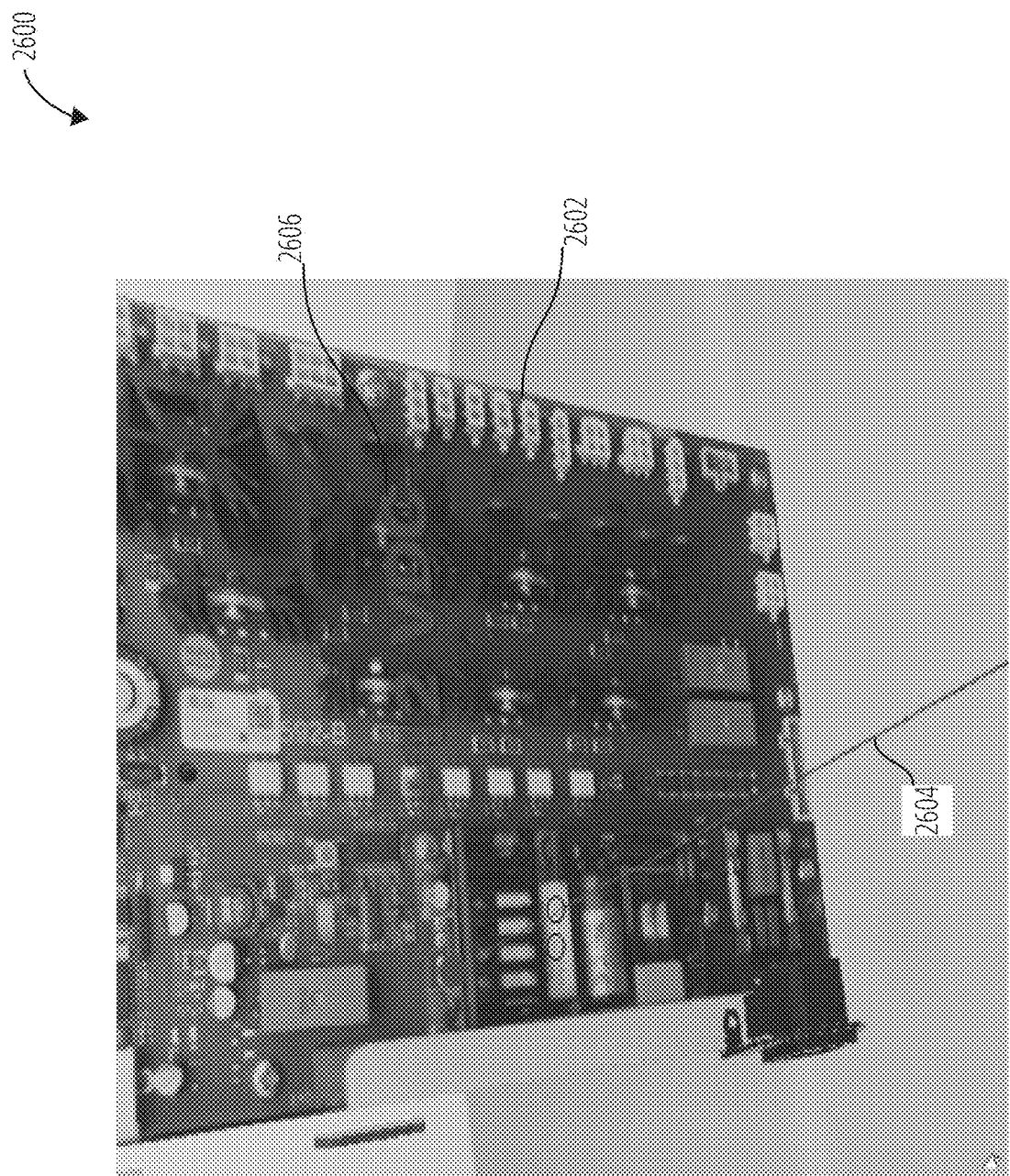
FIG. 26 illustrates an embodiment of a display output 2600.
Figure 27:
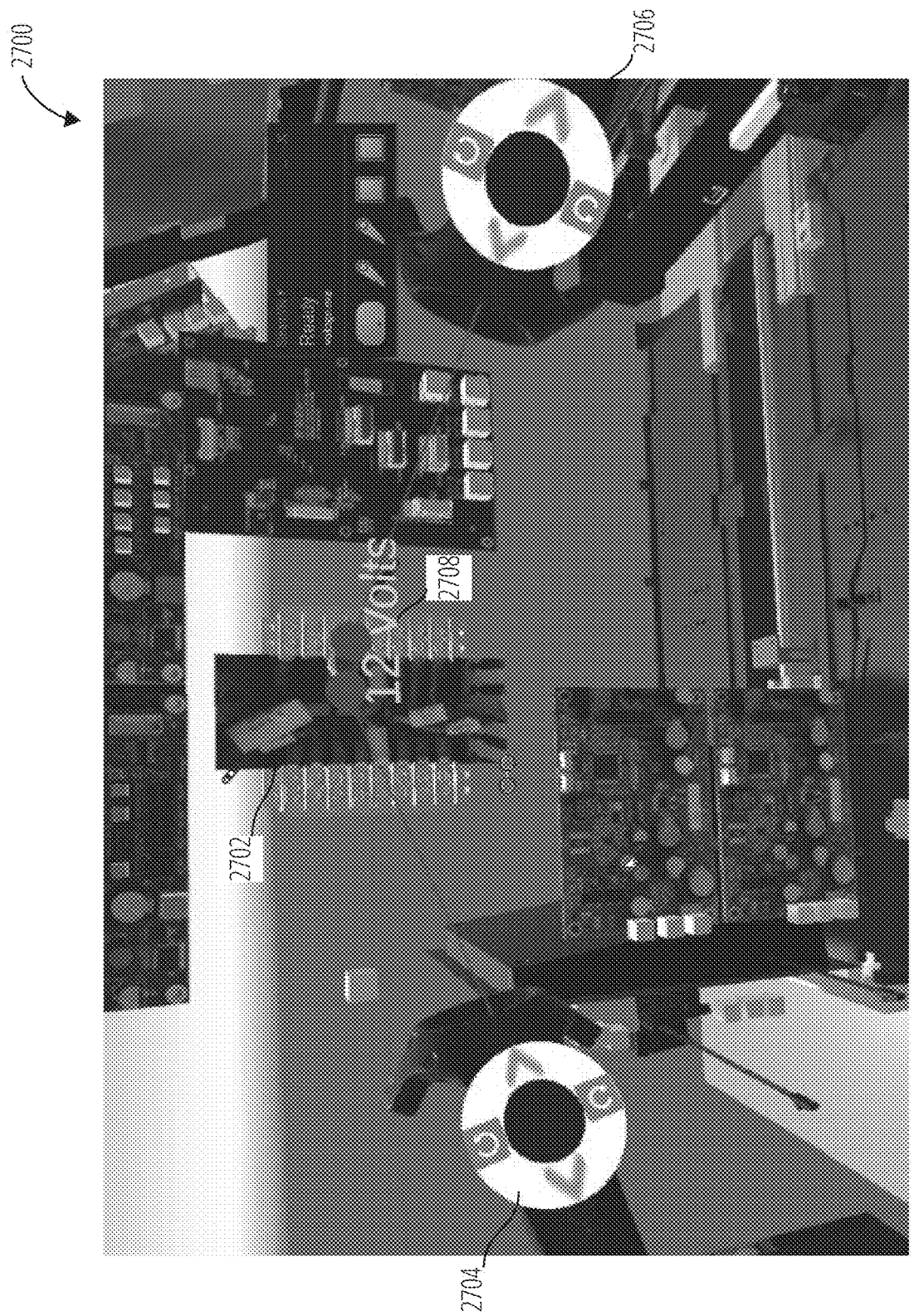
FIG. 27 illustrates an embodiment of a display output 2700.

Once a component or components are able to be selected, such as the component 2102 and the second component 2106, the first component information 2104 and the second component information 2108 may be displayed. The display of the first component information 2104 and the second component 2106 may result from the selection input to the components itself or to the menu 1406. The first component information 2104 and the second component information 2108 may be altered by the selection of more than one components. For example, by selecting the component 2102 and the second component 2106, the first component information 2104 and the second component information 2108 is component information related to wiring the two components together. Each component may have an information plane on which the component information is displayed. The component information may further be a virtual technical manual 2202, as shown in FIG. 22, displayed on the information plane 2204. The virtual technical manual 2202 may have images 2206, text 2208, and controllers 2210. The controllers 2210 may receive a selection input to alter the state of the virtual technical manual 2202. In some embodiments, the virtual technical manual 2202 may be displayed for the virtual device or component through interaction with the menu 1406. As shown in FIG. 23, some components, such as the component 2302, may have a virtual technical manual 2304 with a video feed 2306. The video feed 2306 may display a video of the component 2302 in use, being assembled, being disassembled, during a maintenance operation, etc. and may further include audio. In some embodiments, the component information may also be a set of instructions 2402, as shown in FIG. 24. The set of instructions 2402 may include action to be performed via inputs to the components 2408. For example, as depicted in the display output 2400, wires may be connected to a board. The computer associated with the display output 2400 may then receive selection inputs, input device movements, and movement inputs to alter the location and connections of the components 2408. The indication display controller 2406 may then be operated by a selection input to display the indication 2404 along with the other component information. In some embodiments, the indication 2404 may replace the component information displayed prior to activation of the indication display controller 2406. The activation of the indication display controller 2406 may also alter the set of instructions 2402. For example, the set of instructions 2402 may be altered to a "next step" if the indication 2404 indicates a "correct" state of the components 2408.

In some embodiments, the system may be used for training on a device user interface or graphical user interface usage, programming of the system and how to modify protocols, or how to operate the device or operate the controls of the device. Some virtual devices (or components thereof) may display a simulated user interface such as simulated user interface 2502 in FIG. 25. The simulated user interface 2502 may display simulated operating conditions of the virtual device and the simulated user interface controllers 2504 that may be operated by a selection input to alter the simulated user interface 2502. The virtual devices may also simulate measurements. In some embodiments, the measurements may be measurements to indicate whether an instrument needs to be calibrated or if there is an electrical fault based on input/output values. The component 2602 may receive a selection input indicator 2604 and in response display the virtual electrical measurement 2606. The virtual electrical measurement 2606 may be on an information plane associated with the component 2602. The virtual electrical measurement 2606 may be altered by locating the selection input indicator 2604 at a different location of the component 2602. In some embodiments, a component, such as the component 2702 receives a selection or selection input from the first selection input indicator 2704 and the second selection input indicator 2706, resulting in the virtual electrical measurement 2708. In some embodiments, the simulated user interface measurements may be used to test a user's knowledge if the value shown is within appropriate operating parameters and if not whether the user can determine why not.

Figure 28:
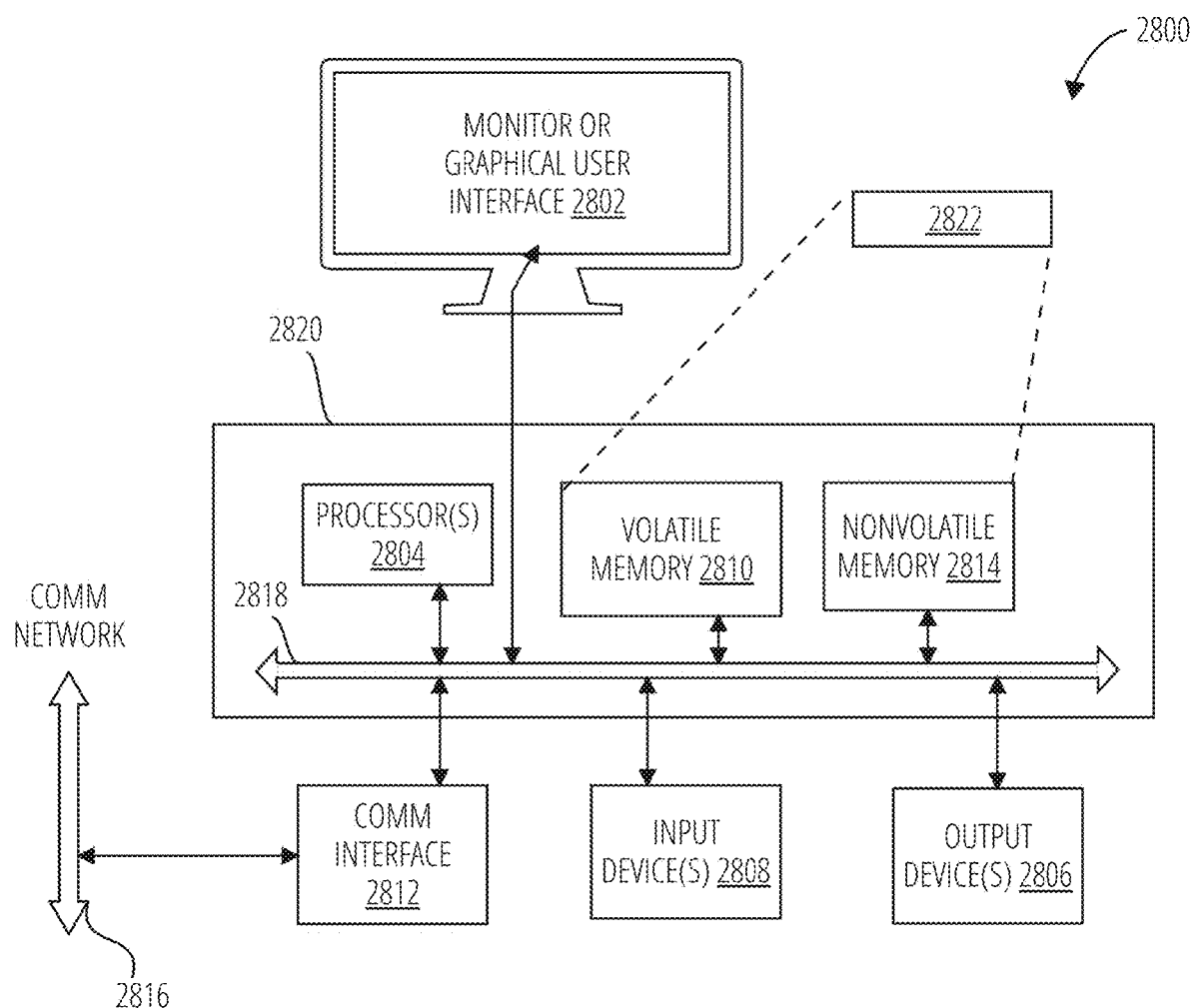
FIG. 28 is an example block diagram of a computing device 2800 that may incorporate embodiments of the present invention.

FIG. 28 is an example block diagram of a computing device 2800 that may incorporate embodiments of the present invention. FIG. 28 is merely illustrative of one embodiment of a machine system that may be used to carry out aspects of the technical processes described herein, and does not limit the scope of the claims. One of ordinary skill in the art would recognize other variations, modifications, and alternatives. In one embodiment, the computing device 2800 typically includes a monitor or graphical user interface 2802, a data processing system 2820, a communication network interface 2812, input device(s) 2808, output device(s) 2806, and the like.

As depicted in FIG. 28, the data processing system 2820 may include one or more processor(s) 2804 that communicate with a number of peripheral devices via a bus subsystem 2818. These peripheral devices may include input device(s) 2808, output device(s) 2806, communication network interface 2812, and a storage subsystem, such as a volatile memory 2810 and a nonvolatile memory 2814.

The volatile memory 2810 and/or the nonvolatile memory 2814 may store computer-executable instructions and thus forming logic 2822 that when applied to and executed by the processor(s) 2804 implement embodiments of the processes disclosed herein.

The input device(s) 2808 include devices and mechanisms for inputting information to the data processing system 2820. These may include a keyboard, a keypad, a touch screen incorporated into the monitor or graphical user interface 2802, audio input devices such as voice recognition systems, microphones, and other types of input devices. In various embodiments, the input device(s) 2808 may be embodied as a computer mouse, a trackball, a track pad, a joystick, wireless remote, drawing tablet, voice command system, eye tracking system, and the like. The input device(s) 2808 typically allow a user to select objects, icons, control areas, text and the like that appear on the monitor or graphical user interface 2802 via a command such as a click of a button or the like.

The output device(s) 2806 include devices and mechanisms for outputting information from the data processing system 2820. These may include the monitor or graphical user interface 2802, speakers, printers, infrared LEDs, and so on as well understood in the art.

The communication network interface 2812 provides an interface to communication networks (e.g., communication network 2816) and devices external to the data processing system 2820. The communication network interface 2812 may serve as an interface for receiving data from and transmitting data to other systems. Embodiments of the communication network interface 2812 may include an Ethernet interface, a modem (telephone, satellite, cable, ISDN), (asynchronous) digital subscriber line (DSL), Fire-Wire, USB, a wireless communication interface such as BlueTooth or WiFi, a near field communication wireless interface, a cellular interface, and the like.

The communication network interface 2812 may be coupled to the communication network 2816 via an antenna, a cable, or the like. In some embodiments, the communication network interface 2812 may be physically integrated on a circuit board of the data processing system 2820, or in some cases may be implemented in software or firmware, such as "soft modems", or the like.

The computing device 2800 may include logic that enables communications over a network using protocols such as HTTP, TCP/IP, RTP/RTSP, IPX, UDP and the like.

The volatile memory 2810 and the nonvolatile memory 2814 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 2810 and the nonvolatile memory 2814 may be configured to store the basic programming and data constructs that provide the functionality of the disclosed processes and other embodiments thereof that fall within the scope of the present invention.

Logic 2822 that implements embodiments of the present invention may be stored in the volatile memory 2810 and/or the nonvolatile memory 2814. Said logic 2822 may be read from the volatile memory 2810 and/or nonvolatile memory 2814 and executed by the processor(s) 2804. The volatile memory 2810 and the nonvolatile memory 2814 may also provide a repository for storing data used by the logic 2822.

The volatile memory 2810 and the nonvolatile memory 2814 may include a number of memories including a main random access memory (RAM) for storage of instructions and data during program execution and a read only memory (ROM) in which read-only non-transitory instructions are stored. The volatile memory 2810 and the nonvolatile memory 2814 may include a file storage subsystem providing persistent (non-volatile) storage for program and data files. The volatile memory 2810 and the nonvolatile memory 2814 may include removable storage systems, such as removable flash memory.

The bus subsystem 2818 provides a mechanism for enabling the various components and subsystems of data processing system 2820 communicate with each other as intended. Although the communication network interface 2812 is depicted schematically as a single bus, some embodiments of the bus subsystem 2818 may utilize multiple distinct busses.

It will be readily apparent to one of ordinary skill in the art that the computing device 2800 may be a device such as a smartphone, a desktop computer, a laptop computer, a rack-mounted computer system, a computer server, or a tablet computer device. As commonly known in the art, the computing device 2800 may be implemented as a collection of multiple networked computing devices. Further, the computing device 2800 will typically include operating system logic (not illustrated) the types and nature of which are well known in the art.

In some embodiments, provided herein is a method for training using a virtual environment. In some embodiments, the user would equip themselves with a virtual reality device and select an instrument to train on and then run the training program for that instruments. In some embodiments, the user may select a specific time point in the training or alternatively, the user may start the training program from the beginning. In some embodiments, provided herein is a method for performing testing a user's familiarity with a virtual device that may be a digital representation of a physical device. The method may further identify areas which the user may need more practice. Further provided herein is a collaborative training environment where more than one user may interact within a virtual environment. One user may be responsible for servicing the digital representation of the instrument and the other user may serve as an assistant. In some embodiments, the methods provided herein allow for a trainer to be located in one location and the trainee to be located in another location. In some embodiments, the methods provided herein may train personnel at least two times faster than traditional training methods. In some embodiments, the methods provided herein include a training program that may be used to test, certify or recertify a user on servicing instruments.

Provided herein are virtual reality systems that may be used for training. The virtual reality system may include a virtual reality headset, at least one selection input, a display, and software including a training module for a digital representation of at least one mechanical device. In some embodiments, the system provided herein would not include software but then could be obtained separately.

Implementation and Interpretation

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

"Constraining relationships" in this context refers to a relationship between two components of a device whereby one of the components is not selectable prior to the other component is removed from the device.

"Hidden component" in this context refers to a component of a device that is not viewable in the virtual environment prior to one or more components are removed from the device.

"Inaccessible component" in this context refers to a non-hidden component that cannot receive a selection input as the selection input location indicator interacts with at least one other component. For example, a component recessed between two other components may be viewable based on the location of the user representation but the selection input location indicator interacts with either of the two other components, either by selected them or by preventing movement of the selection input location indicator to a location to interact with the component.

"One or more virtual tools" in this context refers to a virtual representation of an implement, generally one held in the hand, used to carry out a particular function, the function replicated in the virtual environment. E.g., a screwdriver that may be utilized to interact with components that are screws. However, the motion of unscrewing may not be needed to interact with the screw. The operation of the screwdriver may alter the screw from the screwed state to the un-screwed state, or vice versa.

"Pre-determined script" in this context refers to a sequence of states of a device. The sequence may, for example, show a particular disassembly sequence to access a particular component of the device.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that the various aspects described herein which can be implemented, individually or collectively, by a wide range of logic including hardware, software, firmware, or any combination thereof, and/or can be viewed as being composed of various types of circuitry.

What is claimed is:

1. A system, comprising:
a computer configured to:
generate a virtual environment;
instantiate one or more virtual devices into the virtual environment;
instantiate a user representation into the virtual environment;
cause the display of the virtual environment and the one or more virtual devices on a display output device, wherein the virtual environment and the one or more virtual devices are displayed from the perspective of a location of the user representation in the virtual environment;
receive, from an input device, an input associated with rotation by the user representation in the virtual environment; and
cause the display output device to visually rotate the virtual environment, including the one or more virtual devices, relative to a point of reference in the virtual environment in response to the input, wherein the point of reference in the virtual environment is spaced apart in the virtual environment from the location of the user representation in the virtual environment.

2. The system of claim 1, wherein the display output device is a virtual reality device.

3. The system of claim 1, wherein the display output device is an augmented reality video projector.

4. The system of claim 1, wherein the point of reference is a predefined location relative to the user representation.

5. The system of claim 1, wherein the display output device is a first display output device, and the computer is to cause a second display output device to display the virtual environment, and the input received by the input device to rotate the virtual environment does not rotate the virtual environment in the display of the virtual environment at the second display output device.

6. The system of claim 5, wherein the input device is a first input device, and the computer is configured to inhibit interactions with the one or more virtual devices for a user of a second input device.

7. The system of claim 1, wherein each of the one or more virtual devices comprise one or more components, the computer is configured to instantiate the one or more virtual devices in an assembled configuration or an exploded configuration, and the computer is configured to selectively cause the display of the assembled configuration and the exploded configuration in response to an input from the input device.

8. The system of claim 1, wherein each of the one or more virtual devices comprise one or more components, the computer is configured to selectively cause the display of an enhanced view of one or more of the one or more components in response to an input from the input device, and the input is a selection of a hidden component or an inaccessible component.

9. The system of claim 1, wherein the computer is configured to operate a training program to selectively enable removal of one or more components from the one or more virtual devices in response to an input from the input device.

10. The system of claim 1, wherein the computer is configured to cause the display output device to display a graphical representation of the point of reference in the virtual environment.

11. The system of claim 10, wherein a location of the point of reference relative to display boundaries of the display output device is the same before and after the rotation of the virtual environment.

12. The system of claim 5, wherein the computer is configured to perform an assistance task in the virtual environment in response to an input from a second input device.

13. The system of claim 12, wherein the assistance task includes handing a tool or interacting with a component of a virtual device.

14. The system of claim 1, wherein the computer is configured to cause a screwdriver in the virtual environment to rotate in response to an input from the input device.

15. The system of claim 1, wherein the computer is configured to cause the display output device to display a virtual technical manual for one or more of the virtual devices.

16. The system of claim 1, wherein at least one of the virtual devices is a measurement device to measure a property of another one of the virtual devices.

17. The system of claim 1, wherein at least one of the virtual devices is an instrument for performing a biological application.

18. The system of claim 1, wherein at least one of the virtual devices includes a freezer or refrigerator.

19. The system of claim 1, further comprising:
the input device.

20. The system of claim 1, further comprising:
the display output device.

\* \* \* \* \*